(12) United States Patent  
Sarchi et al.

(10) Patent No.: US 8,953,915 B2
(45) Date of Patent: Feb. 10, 2015

(54) ELECTRIC CABLE WITH STRAIN SENSOR AND MONITORING SYSTEM AND METHOD FOR DETECTING STRAIN IN AT LEAST ONE ELECTRIC CABLE

(75) Inventors: Davide Sarchi, Milan (IT); Bernd Knuepfer, Milan (IT); Carsten Kemnitz, Milan (IT); Roberto Gaspari, Milan (IT); Arnd-Guenther Carl, Milan (IT); Enrico Consonni, Milan (IT); Thomas Kittel, Milan (IT); Reiner Ewald, Milan (IT)

(73) Assignee: Prysmian S.p.A., Milan (IT)

( * ) Notice: Subject to any disclaimer, the term of this patent is extended or adjusted under 35 U.S.C. 154(b) by 3 days.

(21) Appl. No.: 13/322,376

(22) PCT Filed: May 27, 2009

(86) PCT No.: PCT/EP2009/056428
§ 371 (c)(1),
(2), (4) Date: Nov. 23, 2011

(87) PCT Pub. No.: WO2010/136062
PCT Pub. Date: Dec. 2, 2010

(65) Prior Publication Data
US 2012/0082422 A1   Apr. 5, 2012

(51) Int. Cl.
*G02B 6/44*   (2006.01)
*H01B 7/32*   (2006.01)
(Continued)

(52) U.S. Cl.
CPC *H01B 7/32* (2013.01); *G01K 11/32* (2013.01); *G01L 1/242* (2013.01); *G01M 11/086* (2013.01); *G01K 2011/322* (2013.01); *H01B 7/041* (2013.01); *H01B 9/005* (2013.01)

USPC ............................................. 385/101; 73/800

(58) Field of Classification Search
USPC ..................... 385/101, 100; 73/800
See application file for complete search history.

(56) References Cited

U.S. PATENT DOCUMENTS 4,196,307 A * 4/1980 Moore et al. .................... 174/47
4,994,668 A * 2/1991 Lagakos et al. .......... 250/227.19
(Continued)

FOREIGN PATENT DOCUMENTS

DE   39 34718 A1   12/1990
EP   0 203 249 A2   12/1986
(Continued)

OTHER PUBLICATIONS

Dzierża, W. ,Thermoelastic properties of crosslinked polyurethanes. J. Polym. Sci. Polym. Chem. Ed., 17: 693-701, (1979).*

(Continued)

*Primary Examiner* — Peter Radkowski
(74) *Attorney, Agent, or Firm* — Finnegan, Henderson, Farabow, Garrett & Dunner, L.L.P.

(57) ABSTRACT

An electric cable includes a strain sensor longitudinally extending along the cable and including a strain optical fiber arranged within a bending neutral region surrounding and including a bending neutral longitudinal axis of the electric cable, and at least two longitudinal structural elements, at least one of the at least two longitudinal structural elements being a core including an electrical conductor, wherein the strain sensor is embedded in a strain-transferring filler mechanically coupling at least one of the at least two longitudinal structural elements with the strain sensor. With the disclosed cable construction, the strain experienced by the at least one of the at least two longitudinal structural elements is transferred to the strain sensor at least in a strained condition. In the preferred embodiments, the electric cable is a heavy-duty cable.

36 Claims, 11 Drawing Sheets

(51) Int. Cl.
*G01K 11/32* (2006.01)
*G01L 1/24* (2006.01)
*G01M 11/08* (2006.01)
*H01B 7/04* (2006.01)
*H01B 9/00* (2006.01)

(56) References Cited

U.S. PATENT DOCUMENTS

| | | | |
|---|---|---|---|
| 5,767,956 A * | 6/1998 | Yoshida | 356/73.1 |
| 5,918,283 A * | 6/1999 | Patterson et al. | 73/800 |
| 6,237,421 B1 * | 5/2001 | Li et al. | 73/800 |
| 7,397,976 B2 * | 7/2008 | Mendez et al. | 385/12 |
| 2002/0136526 A1 * | 9/2002 | Pottebaum et al. | 385/143 |
| 2003/0118296 A1 * | 6/2003 | Smith | 385/102 |
| 2004/0165178 A1 * | 8/2004 | Clements | 356/73.1 |
| 2004/0252954 A1 * | 12/2004 | Ginocchio et al. | 385/100 |
| 2004/0258373 A1 * | 12/2004 | Andreassen | 385/100 |
| 2005/0039549 A1 * | 2/2005 | Teraoka | 73/862.627 |
| 2006/0120675 A1 * | 6/2006 | Goldner et al. | 385/104 |
| 2006/0165344 A1 * | 7/2006 | Mendez et al. | 385/13 |
| 2007/0289741 A1 * | 12/2007 | Rambow | 166/250.01 |
| 2008/0047662 A1 * | 2/2008 | Dria et al. | 156/249 |
| 2008/0236867 A1 | 10/2008 | Varkey et al. | |
| 2010/0277329 A1 * | 11/2010 | Worzyk | 340/679 |
| 2011/0048136 A1 * | 3/2011 | Birch et al. | 73/705 |
| 2011/0172519 A1 * | 7/2011 | Cao et al. | 600/424 |

FOREIGN PATENT DOCUMENTS

| | | | | |
|---|---|---|---|---|
| GB | 2 368 921 A | | 5/2002 | |
| JP | 2000146570 A | * | 5/2000 | G01B 21/32 |
| JP | 2002054956 A | * | 2/2002 | G01D 21/00 |
| WO | WO 00/21098 | | 4/2000 | |
| WO | WO 00/57540 | | 9/2000 | |
| WO | WO 01/78086 A1 | | 10/2001 | |
| WO | WO 2005/035461 A1 | | 4/2005 | |
| WO | WO 2007/104915 A1 | | 9/2007 | |
| WO | WO 2007/107693 A1 | | 9/2007 | |
| WO | WO 2008/037291 A1 | | 4/2008 | |
| WO | WO 2008/073033 A1 | | 6/2008 | |
| WO | WO 2008/132637 | | 11/2008 | |

OTHER PUBLICATIONS

Xihao et al.; "Strain Transfer Capability of Strain Sensing Optical Fiber Cable and Its Measurement Method", Proceedings of the 57th International Wire & Cable Symposium, pp. 424-428, (2008).

International Search Report from the European Patent Office in International Application No. PCT/EP2009/056428 mailed Mar. 24, 2010.

Machine translation of JP 2002-54956.

* cited by examiner

ELECTRIC CABLE WITH STRAIN SENSOR AND MONITORING SYSTEM AND METHOD FOR DETECTING STRAIN IN AT LEAST ONE ELECTRIC CABLE

CROSS REFERENCE TO RELATED APPLICATION

This application is a national phase application based on PCT/EP2009/056428, filed May 27, 2009, the content of which is incorporated herein by reference.

FIELD OF THE INVENTION

The present invention relates to an electric cable with an integrated strain sensor, suitable in particular for the measurement of static and dynamic tensile strains.

The present invention is directed also to a monitoring method and system for measuring at least the strain in at least one electric cable.

The present invention further relates to a monitoring system and method for detecting strain in a plurality of electric cables. In particular, the present invention concerns monitoring system and method using Brillouin backscattering techniques for monitoring a plurality of electric cables installed in mobile equipments.

BACKGROUND OF THE INVENTION

Electric cables, in particular for heavy-duty applications and/or for mobile installations, such as mobile harbour cranes, ship-to-shore container cranes, ship un-loaders, spreaders, and mining and tunnelling equipment, are specifically designed to withstand harsh environment conditions and high mechanical stresses, such as tensile forces and torques. As a further example of cables for heavy-duty applications, down well pump cables for supplying current to submersible electricity pump systems in deep wells are usually installed in physically restricted areas and in hostile environments, often being in contact with corrosive well fluids. Typically, the above cables are designed to be robust and flexible. Within the present description, we will in general refer to heavy-duty cables, when referring to cables for heavy-duty applications and in particular, but not exclusively, for mobile installations.

An example of heavy-duty electric cable is provided in DE 3934718, which describes an armoured trailing cable for shearer loaders in mines.

WO 01/78086 discloses an electric cable in particular for use in a pick-up system such as a crane or shelving system. The cable comprises a core, which includes first conductors, completely surrounded by and embedded within a first stress-bearing matrix. At least one further layer is disposed about the first stress-bearing matrix and has at least one further conductor in the further layer which is completely surrounded by and embedded within a second stress-bearing matrix. The stress-bearing matrices in the cable are said to allow the distribution of stress throughout the cable and thus to substantially reduce the corkscrew effect.

Tensile loads and twisting in a mobile cable may result from forced guidance of the cable during the winding and unwinding phases around reels or from collection of the cable within baskets (e.g., for spreader cables). Winding and unwinding phases are typically discontinuous and often abrupt, for example when caused by a horizontal movement of a crane, thereby imposing significant dynamic tensile loads on the cable, and thus on the individual conductors within the cable. In addition, other systems for cable movement, such as pulley systems and tender systems, generally involve high tensile loads on the cable during operation.

Excessive elongation of the cable can cause the tensile loads to be transferred to the electrical conductors with consequent damage of the latter. Excessive and/or prolonged tensile loads may result in a permanent elongation of the cable, which would shorten the life of the cable.

U.S. Pat. No. 5,767,956 describes the use of backscattering Brillouin light to provide a monitoring device that is capable of observing, in real time, whether an optical fibre is normal or on the verge of fracture. The device uses optical time domain reflectometry (OTDR) to monitor a stimulated Brillouin scattering light by utilizing one of optical fibre cores in an optical cable. No hint is provided about the use in an electric cable.

WO 08/073,033 describes a system for monitoring the bending and strain of a power cable connected to a moving offshore platform by measuring the strain in optical fibres attached to or incorporated into the power cable. A bend in the power cable will give rise to a strain in the optical fibre and this strain will change the optical properties of the fibre. The change in optical properties can be measured by means of optical time domain reflectometer (OTDR) or optical frequency domain reflectometer (OFDR).

This document does not face the problem of protecting the strain sensor from external mechanical stresses in order to avoid damage of the sensor and to ensure long-term reliability of the measurements. On the contrary, the application states that there exists a risk that the optical fibres embedded or attached to the cable might be damaged and thus it is suggested to equip the cable with redundant fibres. Furthermore, there is no mention of the problem of strain transfer between the fibres and the cable to be measured. As possible location for the fibre, the interstices between armouring wires are mentioned.

US 2004/0258373 describes a composite cable, which can be embedded in buildings, umbilical or pipelines, comprising optical means for monitoring temperature and strain. The cable comprises an outer protective sheath and optical means for monitoring temperature and strain, said optical means being within said outer protective sheath and comprising: a first tube including at least a first optical fibre in order to monitor the temperature, said first optical fibre being loose in said first tube and comprising at least one reflecting section called Bragg grating, at least a second optical fibre including at least one Bragg grating in order to monitor the strain, said cable being characterized in that said second optical fibre is outside said first tube, said optical means further comprising means for tightening said second optical fibre.

The Applicant has noted that this document does not disclose an electrical cable with an integrated strain optical fibre sensor, or with an integrated temperature sensor. The disclosed cable is a composite cable that can include power cables, however separated from the fibres for strain and temperature monitoring.

EP 0203249 discloses a medium-voltage (from 6 to 60 kV) power cable that includes at least one temperature and/or tension sensor optical fibre.

The Applicant has observed that the disclosed strain sensor optical fibre integrated in the cable can be significantly affected by bending of the cable depending on the position of the optical fibre within the cable and/or the amount of bending of the cable, in particular when exceeding a certain value.

Chen Xihao and Huang Junhua, in *Strain Transfer Capability of Strain Sensing Optical Fiber Cable and its Measurement Method*, published in the Proceedings of the 57th International Wire & Cable Symposium (2008), pages 424-428, analyse different structures of sensing optical fibre cables (i.e. cables to be used for sensing the strain of an associated device or system). The tightness of layers within the strain sensing optical fibre cable is said to be of great importance and can be described by the strip force between the cable layers and the strain transfer capability, i.e., the maximum strain that can be transferred from the cable outer layer to the inner fibre without reduction.

This document does not mention any application of the disclosed sensing optical fibre cables to cable monitoring of power or electric cables.

WO 07/107,693 discloses a fibre optic cable including a strain transfer member, a central optical fibre disposed through the strain transfer member, and a tight jacket mechanically coupling the central optical fibre and the strain transfer member. Strain experienced by the strain transfer member is transferred to the central optical fibre via the tight jacket.

The document does not face the problem of an electric cable with a fibre optic sensor.

The Applicant has been faced with the problem of how to realise an electric cable, in particular suitable for heavy-duty applications and more particularly for mobile installations, which would allow controlling, and preferably real-time monitoring, of the tensile strain to which the cable is subjected during operation while ensuring long-term reliability of the measurements.

In particular, the Applicant has tackled the problem of carrying out measurements in an electric cable by a sensor which remain substantially unaffected by external mechanical stresses others than tensile strain imposed on the cable.

SUMMARY OF THE INVENTION

Due to the high mechanical stresses imposed during operation, the typical lifetime of a heavy-duty cable (such as for mining applications or crane installations) is in general relatively short and, depending on the specific application, can vary between few months to few years. The Applicant has observed that it would be advantageous to provide a heavy-duty cable that can be monitored during its operation. By knowing the temporal evolution of the cable condition, an effective periodic maintenance of the cable can be carried out, for example it is possible to adjust guiding roller malfunctioning and/or to adjust the electronic control parameters of the automation system in the mobile equipment.

Periodic checks of the cable conditions could be made "off-line" with a cable not in use or even removed from the equipment on which it was mounted, but in the practice such checks are generally not carried out because of the loss of working time due to the necessary stop of the equipment or apparatus containing the cable.

It would be particularly advantageous to record, during the cable work, dynamic events that induce elastic strain peaks, which can however damage the cable by fatigue. Also, such a monitoring could prevent unexpected out-of-service events and save relevant costs.

An object of the present invention is to provide an electric cable with a strain sensor capable of providing readings for a substantially large range of measurable elongations, in particular of from 0.1% to 1%, preferably of from −0.2% to 1%. Higher elongation values, for example up to 2% or even up to 4%, could also be measured.

In such case, a decrease in the speed of the data reading may arise, which could affect the "real time" collection of data from the monitored cable.

An another object of the present invention is provide an electric cable with a strain sensor measuring dynamic tensile loads, in particular monitoring strain bursts in a localised portion of the cable length, thereby determining the fatigue-induced damage.

A further object of the present invention is to provide a monitoring system for detecting permanent damage of the electric cable possibly caused by intrinsic wear or by an improper use, for example by a use not compliant with the recommendations provided by the cable manufacturer.

A still another object of the present invention is to provide a monitoring system for monitoring at least the tensile strain of a plurality of electric cables, in particular of heavy-duty cables installed in mobile equipments.

In general terms and according to an aspect, the solution relates to an electric cable comprising at least two longitudinal structural elements and an optical fibre strain sensor for monitoring of the tensile strain along the cable length. The strain sensor comprises an optical fibre that extends along the cable length. The optical fibre of the strain sensor will be referred in the following also to as the strain optical fibre.

Within the present description, the term "longitudinal structural element" indicates a semi-finished structure of the electric cable substantially longitudinally extending along the cable length. The longitudinal structural elements according to the present description and claims contribute to the electric transport function of the cable as it will become clear from the following.

The at least two longitudinal structural elements comprised in the electric cable include at least one cable core.

The term "core" indicates a semi-finished structure of the electric cable comprising at least one electrical conductive element, such as an electrical conductor and, typically, at least one insulating layer surrounding the electrical conductor. In the typical configurations, the electrical conductors comprise a plurality of stranded conductive wires.

The Applicant has realised that by ensuring mechanical coupling, and in particular mechanical congruence, between the longitudinal structural elements of the electric cable and the optical fibre of the strain sensor, the strain transfers from the longitudinal structural elements to be monitored to the strain optical fibre. With "mechanical congruence" it is meant the capacity of two or more parts of moving or withstand strain substantially as a whole. The just described mechanical congruence allows obtaining a cable capable of providing reliable readings of the experienced static and dynamic tensile loads within a relatively large range of elongations. According to an aspect of the invention, the strain sensor is embedded in a strain-transferring filler mechanically coupling the sensor with at least one of the at least two longitudinal structural element of the cable.

The tensile strain is expressed as percent increase in length of the cable over a starting length, $\Delta L/L$, wherein L is length, namely as a percent linear elongation. The tensile strain originates when the cable is forced to stretch by external forces (e.g., tensile loads) in its longitudinal direction.

The Applicant has realised that the strain sensor should be integrated in the cable and arranged so as to remain substantially undamaged by bending of the cable at the minimum bending radius thereof. In particular, the Applicant has understood that the optical fibre comprised in the strain sensor should be located within a bending neutral region extending longitudinally along the cable and having a transverse cross-section extending substantially symmetrically about a neutral axis of the cable, hereafter referred to as the neutral region.

As used herein, the term "neutral region" is intended to describe a region around an axis ("neutral axis") where the bending-induced elongations are minimal. The neutral axis can be defined as an imaginary line along the cable length where, being the cable subject to bending, no significant longitudinal deformation takes place and bending stresses are minimal in the strain sensor. Preferably, cable is designed so that the neutral axis is located in a position where torsion acting on the cable determines a minimal longitudinal elongation of the sensor fibre.

Given a minimum bending radius for an electric cable, which generally corresponds to the smallest radius of curvature, $\rho_{min}$, which is allowed for the cable in order to avoid any permanent damage, the neutral region can be defined as the region where the strain sensor undergoes to an elongation not larger than 2%, and preferably not larger than 1%, due to the bending at radii of curvature not smaller than $\rho_{min}$. Positioning of the strain optical fibre within the neutral region prevents its rupture or permanent damage due to cable bending.

In round cables, i.e. cables having a circularly symmetrical cross section, the neutral region is a radial region around the neutral axis in a cross-sectional plane of the cable. In the preferred embodiments, when referred to round cables, the neutral axis is the central longitudinal axis of the cable. Preferably, the strain sensor is disposed along the cable within a radial distance from the neutral axis of not more than $0.02\rho_{min}$ and more preferably of not more than $0.01\ \rho_{min}$.

According to an aspect, the present invention is directed to an electric cable comprising a strain sensor longitudinally extending along the cable and including a strain optical fibre arranged within a bending neutral region surrounding and including a bending neutral longitudinal axis of the electric cable, and at least two longitudinal structural elements, at least one of the at least two longitudinal structural elements being a core comprising an electrical conductor, wherein the strain sensor is embedded in a strain-transferring filler mechanically coupling at least one of the at least two longitudinal structural elements with the strain sensor. With the cable of the invention, the strain experienced by the at least one of the at least two longitudinal structural elements is transferred to the strain sensor at least in a strained condition.

Heavy duty cables are designed to bear lateral loads and tensile forces that compress the longitudinal structural elements inside the cables. The Applicant has observed that it would be advantageous if the strain sensor remains substantially unaffected by lateral compressions of the cable, which, when affecting the strain optical fibre, may cause optical losses due to microbending. Furthermore, when the optical fibre of the strain sensor is compressed, part of the lateral load, which is applied in a direction transverse to a cable longitudinal axis, could be incorrectly transformed into a tensile strain variation. In particular, it has been observed that when a lateral compression is applied in a direction orthogonal or in general transverse to the cable longitudinal axis, if the lateral compression is transmitted to the optical fibre, a component parallel to the strain fibre axis may induce a strain variation along that axis.

Preferably, the neutral axis of the cable is selected such not to substantially suffer from lateral compression in a direction transversal to the longitudinal direction of the cable. The Applicant has found that it is advantageous to surround the strain optical fibre with a protective sheath to improve mechanical resistance to lateral loads, said protective sheath directly contacting the optionally buffered optical fibre of the strain sensor. Preferably, the protective sheath comprises a fibre reinforced composite.

An electric cable typically undergoes one or more thermal treatments, in particular curing processes, during the manufacturing thereof, which involve thermal treatments at typical temperatures of about 150-200° C. for a few minutes. The Applicant has noted that it is preferred that the strain transferring filler and the strain sensor comprise materials resistant to the curing processes taking place during manufacturing of the cable in which the strain sensor is integrated, while maintaining (1) the elastic properties of the strain sensor which enable reversibility of the strain sensor with no permanent deformation of the same, at least in the range where the cable exhibits an elastic behaviour, and (2) the adhesion or high-friction resistance to unwanted slippage so as to maintain mechanical congruence between layers and cable elements.

Preferably, the protective sheath is made of a fibre reinforced composite in which the reinforcing fibres are carbon, graphite, boron, aramid, or glass fibres; the polymer embedding the reinforcing fibres is preferably a cross-linked resin, for example unsaturated polyester, such as vinyl esters, or epoxy resin.

Preferably, the strain-transferring filler is based on an elastomer material, more preferably on a thermosetting elastomer. The strain transferring filler is at least elastic in the strain range where the cable has an elastic behaviour.

The Applicant has noted that it would be advantageous to provide the power cable with a temperature sensor.

Operational temperatures of a heavy-duty cable can range from −50° C. to 90° C., where −50° C. is the minimum ambient temperature during work and 90° C. is the maximum temperature reached by the electrical conductors during operation. A longitudinally localized increase of the internal temperature of the cable, averaged across a certain time interval (i.e., no spike increase), may indicate the presence of a damage causing, for example, an increase of the conductors resistance and local Joule losses. Furthermore, the electric load influences the overall cable temperature and thus, with reference to the Arrhenius model that predicts failure acceleration due to temperature increase, monitoring of the cable temperature permits to forecast the residual lifetime of the cable and thus a well-timed planned substitution of the same.

Temperature monitoring can be used to decouple the strain from the temperature effects in the Brillouin-based optical analysis.

In order to have a temperature measurement influenced only by the thermal status of the fibre glass of the strain optical fibre, the optical fibre should be free from mechanical stresses, and in particular should be substantially unaffected from tensile strain, of the cable in which it is integrated. In some preferred embodiments, a temperature sensor is integrated in the electric cable, wherein the temperature sensor comprises an optical fibre loosely inserted in a longitudinally extending module stranded with the longitudinal structural elements of the cable. In such construction, the degree of fibre looseness (i.e. the amount of excess fibre length in the tube) is such that the expected maximum elongation of the cable (and of the fibre housing tube) is fully compensated, so that no significant strain is transferred to the temperature sensing optical fibre.

In some preferred embodiments, the electric cable is a round cable with a substantially circular cross-section and comprises at least three longitudinal structural elements positioned radially external with respect to the strain sensor.

BRIEF DESCRIPTION OF THE DRAWINGS

The present invention will be now described more fully hereinafter with reference to the accompanying drawings, in which some, but not all embodiments of the invention are shown. Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

FIG. 1b is a schematic cross-sectional view of the electric cable shown in FIG. 1a.

FIG. 2a is a schematic perspective view of a strain sensor used in an electric cable of the present invention.

FIG. 2b is a schematic cross-sectional view of the strain sensor shown in FIG. 2a.

DETAILED DESCRIPTION

Figure 1A:
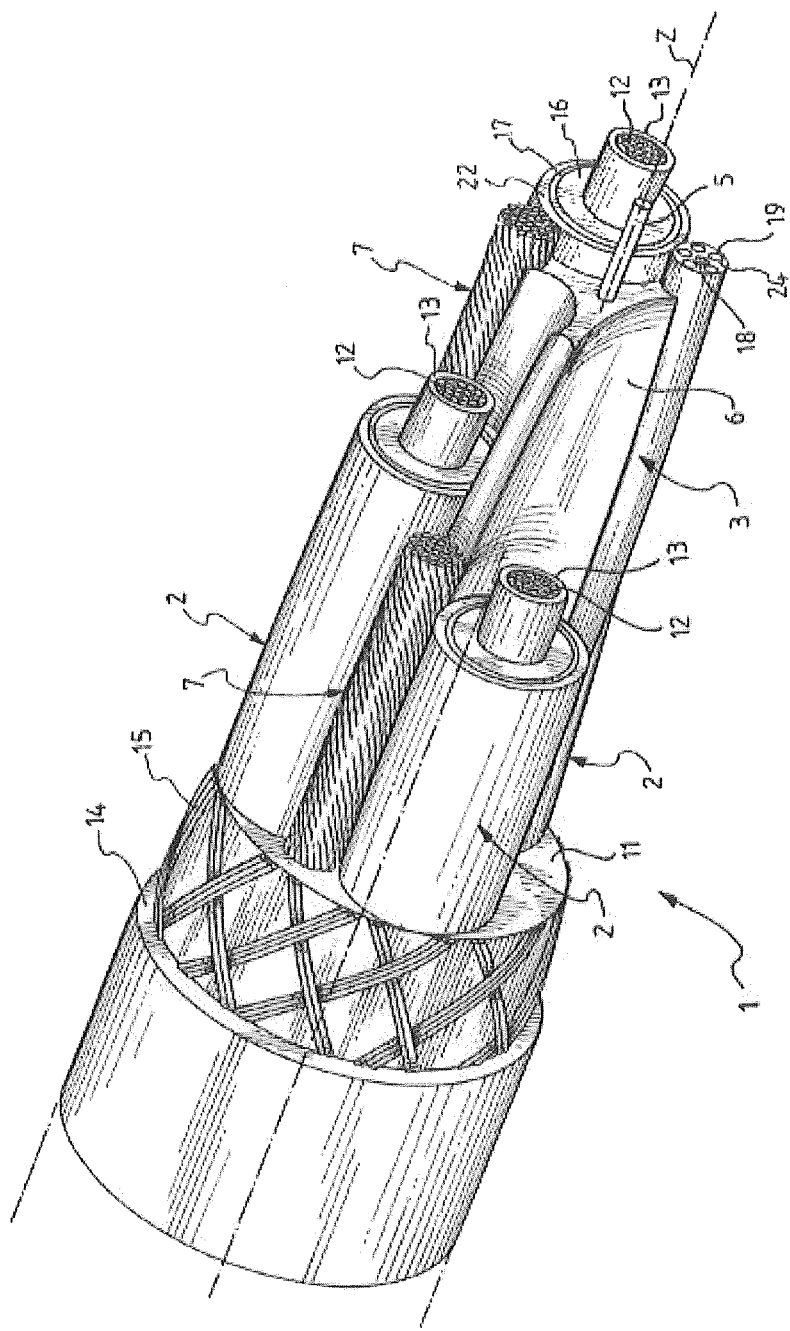
FIG. 1a is a schematic perspective view of an electric cable, according to an embodiment of the present invention.
Figure 1B:
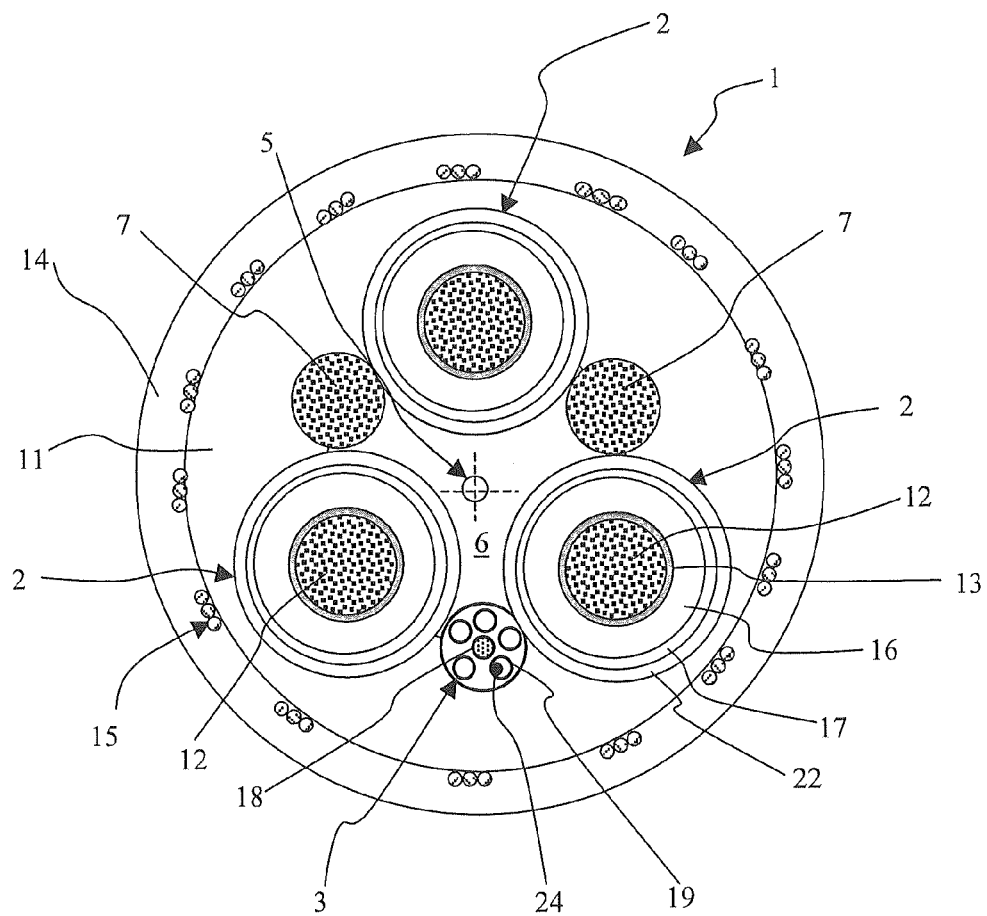

FIGS. 1a and 1b illustrates, respectively, a perspective view and a cross-sectional view of an electric cable, according to an embodiment of the present invention. The cable shown of this embodiment can be suitable for heavy-duty applications, more particularly for mobile installations. Cable 1 is a round cable comprising three cores 2 radially arranged about a central longitudinal axis Z (visible in FIG. 1a) of the cable. The cores 2 can provide three-phase power transmission. Cable 1 can be a low or medium voltage power cable, where low voltage indicates a voltage of up to 1 kV and medium voltage indicates a voltage of from 1 kV to 60 kV. Each core 2 comprises an electrical conductor 12, for example a copper conductor formed by a bundle of tinned or bare copper electrical wires stranded together according to conventional methods. In radial external position with respect to each electrical conductor 12, an inner semi-conductive layer 13, an insulating layer 16, an outer semi-conductive layer 17 are sequentially provided. Inner semi-conductive layer 13, insulating layer 16 and outer semi-conductive layer 17 are made of polymeric-based materials that can be extruded one on top of the other or co-extruded onto the conductor 12. The insulating layer 16 can be for example of cross-linked ethylene propylene rubber (EPR); the inner and outer semi-conductive layers 12 and 17 can be, for example, of EPR, ethylene/propylene/diene terpolymers (EPDM) or a mixture thereof, charged with a suitable amount of a conductive filler, which can be typically carbon black.

Alternatively, whenever the operating conditions enable to do so, both the insulating layer and semiconductive layers can be made of thermoplastic compounds, such as polypropylene based compounds.

In some applications, the cable core 2 comprises at least one metallic screen layer 22 in a radially external position with respect to the outer semi-conductive layer 17.

It is to be understood that the above description of cores 2 represents only one of the possible structures of the cores comprised in the electric cable, which in general can be phase cores for power transmission or grounding, cores for carrying control signals or cores carrying both power and control signals.

According to a feature of the invention, electric cable 1 comprises a fibre optic strain sensor 5.

Due to the fact that heavy-duty cables undergo frequent mechanical stresses during their lifetime, the Applicant has realised that it is of particular relevance to locate the strain sensor within the cable in such a way that the strain optical fibre is not damaged by bending of the cable to any radius of curvature being not smaller than the minimum radius of curvature, $\rho_{min}$, which corresponds to the minimum radius at which the cable can be bent without permanent damage. Cable bending induces an elongation in the strain sensor. It has been observed that the strain sensor is generally undamaged by cable bending at radii of curvature not smaller than $\rho_{min}$ when the longitudinal strain induced by bending is smaller than the strain applied to the fibre in a strain test of typically 1 or 2%.

The region of the cable extending along the cable length wherein the strain optical fibre remains undamaged due to cable bending, is defined as the (bending) neutral region of the cable. In round cables, in a cross-sectional plane of the cable, the neutral region is a radial region about the neutral axis, which corresponds, in the present embodiment, to the central longitudinal axis Z.

Preferably, within the neutral region of the optical cable, the strain sensor undergoes to an elongation equal to or lower than 2%, more preferably equal to or lower than 1%, due to the bending at $\rho_{min}$.

The Applicant has observed that the values of $\rho_{min}$ specified for heavy-duty cables, especially for applications in mobile equipments, can be relatively low, e.g., 250 mm, and thus, in order to guarantee bending resistance of the strain sensor, the neutral region should have a relatively small radial distance from the central longitudinal axis, e.g., not greater than 5 mm. For example, always with reference to round cables, for $\rho_{min}$=300 mm, the radial distance in order to have 1% of elongation is of 3 mm.

In some preferred embodiments, the neutral region is disposed along the cable length within a distance from the central longitudinal axis (namely, the neutral axis) of not more than 0.02 $\rho_{min}$ and preferably of not more than 0.01 $\rho_{min}$.

It particular, it has been observed that positioning the strain sensor substantially along the central longitudinal axis can be advantageous because, in some practical cases, it corresponds to a symmetry axis of the radially external cores and/or, as described in the following, it may be compatible with a simplified cable manufacturing process.

Further to cores 2 for transmission of power and/or control signals, the electric cable 1 comprises at least one earth conductor 7. In the embodiment shown in FIGS. 1a and 1b, the cable comprises two earth conductors 7, for example in form of a bundle of stranded tinned or bare copper electrical wires. Especially for medium-voltage applications, the bundle of electrical wires of the earth conductors can be surrounded by a semi-conductive layer (not shown in the figures). The earth conductors 7 are arranged radially external with respect to the strain sensor 5 and are stranded together with the cores 2 along a cable longitudinal direction. In particular, cores 2 and earth conductors 7 are helically wound about the central longitudinal axis Z of the cable, in accordance with conventional methods.

In the embodiment shown in FIGS. 1a-1b, cable 1 comprises an optical fibre element 3 including a plurality of optical fibres, e.g., from 6 to 24 fibres, for transmission of control signals, voice, video and other data signals. A single optical fibre or a fibre pair can be inserted in a loose-tube buffer construction in longitudinally extending modules 19, preferably made of a flexible material such as polybutylene terephthalate (PBT) or ethylene tetrafluoroethylene (ETFE). In the illustrated example, the modules containing the fibres are SZ helically wound around a longitudinal strength member 18, being for example a glass fibre, an aramid filament or a carbon fibre. The optical fibre element 3 can be stranded together with the cores 2 and earth conductors 7. In general, if the cable construction allows it, the earth conductors and the optical fibre element can be arranged in the outer interstices formed by the cores 2.

Cores 2 and, if present, earth conductors 7 and/or the optical fibre element 3 are collectively referred to as the longitudinal structural elements of the electric cable.

The tensile strain experienced by the electric cable takes to be transferred to the strain sensor for measuring the cable strain. For strain transfer, the strain sensor is mechanically congruent with at least one longitudinal structural element in the cable in such a way that the strain experienced by the least one longitudinal structural element is at least partially, but significantly, transferred to the strain sensor. To this end, the strain sensor 5 is embedded in a strain-transferring filler 6 that mechanically couples the strain sensor with at least one longitudinal structural element of the electric cable. Preferably, the strain-transferring filler mechanically couples the strain sensor with each of the cores integrated in the electric cable, more preferably with each of the circumferentially arranged longitudinal structural elements.

The Applicant has realised that the relationship between the strain measured by the strain sensor and the strain experienced by the cable, i.e., by at least one longitudinal structural element of the cable, should be such that an elongation experienced by the electric cable is univocally correlated with the elongation of the sensor optical fibre, and thus with the measured values of the strain.

Applicant has understood that, in order to guarantee univocal correlation between the elongation of the strain sensor and of that of the electric cable, the contact between strain-transferring filler and the at least one longitudinal structural element should show no significant sliding losses at least in strained condition. In most cases of interest, a substantial absence of sliding loss between sensor and element/s implies an adherence with friction or bonding between them. A mechanical coupling between two elements causing substantially the same deformation as a result of no significant sliding losses between the elements, is herein referred to as mechanical congruence.

In the embodiment illustrated in FIGS. 1a-1b, the geometrical configuration of the strain-transferring filler 6 is such that the filler contact a plurality of longitudinal structural elements positioned in radial external position with respect to the strain sensor 5, also when the cable is in a substantially unstrained condition.

From the geometrical construction of the electric cable and the number of longitudinal structural elements integrated in the cable, the strain-transferring filler 6 of FIGS. 1a and 1b has a shape approximately of a trefoil.

As used herein, with "substantially unstrained condition" it is intended to describe a reference condition of the electrical cable with an average reference strain in the fibre of the strain sensor, which may correspond to a condition before handling the cable from its original drum provided by the manufacturer, such as before the transfer to winding and anchoring reels or tender and pulley systems. In most practical cases, however, the reference condition refers to the cable after installation in the mobile equipment, i.e., after transfer from the original drum, and before employment, thus before being exposed to relevant tensional loads. A preferred reference condition can correspond to the state of the cable mounted on the crane, the crane being set at the maximum extension thereof, i.e. the cable is deployed for most of its length. Measurements effected by the Applicant have shown that, in the substantially unstrained condition, in a cable comprising a single-mode 250-µm optical fibre as strain optical fibre, the strain ranged from −0.2 to 0.3%. Said cable strain can vary along the cable length, due to manufacturing conditions, though a cable with a residual strain, which is substantially longitudinally constant, is preferred since it may simplify monitoring of the cable in accordance to the invention.

The substantially unstrained condition provides a reference value with respect to which the strain of the cable in use is measured. In Brillouin methods, wherein distributed strain along the cable length is measured, the substantially unstrained condition can refer to a plurality of reference values measured at different locations along the cable length.

As strained condition is intended any condition different from the substantially unstrained condition, as defined herein. Tensile stresses in the cable can be measured as strain deviations, namely increments if the cable is elongated or decrements if the cable is compressed, from the average reference value.

The strain-transferring filler 6 is made of a material having elastic properties such to react to the maximum strain for which the cable exhibits an elastic behaviour without permanent deformation of the filler (i.e., reversibility of the deformation). The strain-transferring filler material is selected to suitably stretch along the cable undergoing elongation and to substantially recover the deformation when the external tensile loads are removed, at least for tensile loads corresponding to the allowed maximum strain, beyond which a permanent and irreversible deformation of the cable takes place.

The strain-transferring filler 6 can be based on a polymeric material, advantageously extruded around the strain sensor 5. Thermosetting elastomers having an elastic behaviour within a relatively large range of strain, e.g., exceeding 1%, were found to be particularly suitable for the cable of the invention. Advantageously, thermosetting elastomers are observed to adhere with high friction to the surfaces of the longitudinal structural elements. For example, it has been noted that thermosetting elastomers provide a strong adhesion with the semi-conductive materials that typically surround the cores of some electric cables, while exhibiting a friction not detrimental for the semi-conductive external surface of the cores. A reliable strain transfer having a predicable or at least derivable relationship between the strain experienced in a longitudinal structural element of the cable and the strain measured in the sensor was observed to occur.

Advantageously, the material of the strain-transferring filler is resistant to thermal treatments that may take place during cable manufacturing, such as during curing of the outer sheath of the electric cable, typically carried out at approximately 200° C.

Preferably, the strain-transferring filler comprises a thermosetting elastomer cross-linked by means of steam pressure, irradiation with electron beam, salt bath dipping or silane cross-linking systems. In general, the strain-transferring filler is preferably made of elastomers having an elastic modulus between 0.01 and 0.7 GPa. For example, the strain-transferring filler is selected from the group consisting of ethylene propylene diene rubber (EPDM), ethylene propylene rubber (EPR), nitrile-butadiene rubber (NBR).

Although thermosetting elastomers are preferred because of their temperature resistance adhesion properties and large elasticity range, the use of thermoplastic elastomers is not excluded. Examples of thermoplastic elastomers include styrene-diene-styrene triblock copolymers; thermoplastic polyester elastomers and thermoplastic polyurethane elastomers; and thermoplastic polyolefin rubbers (polyolefin blends).

In some embodiments, the strain-transferring filler 6 can be electrically conductive.

Interstitial areas 11 are filled with polymeric filler such as an EPR based compound. An outer jacket 14 is provided, for example by extrusion. To increase the resistance of the electric cable to mechanical stresses, the outer jacket 14 is preferably made of a cured polymeric material, preferably based on a reinforced heavy-duty thermosetting elastomer, such as high density polyethylene (HDPE), polychloroprene, polyurethane or NBR-based compound.

Optionally, to increase the torsion resistance of the electric cable, an armour 15 in form, for example, of braids or double spiral of reinforcing yarns, such as metal or polyester yarns, for instance made of Kevlar® (aromatic polyamide), is provided.

The Applicant has realised that, in order to ensure that strain transfer takes place between the optical fibre of the strain sensor and the longitudinal structural elements of the cable, across the whole range of measurable values of elongations, it is advantageous that strong and substantially uniform adhesion is present among the layers surrounding the optical fibre and mechanically coupling the optical fibre with the strain-transferring filler. This allows mechanical congruence between the optical fibre of the strain sensor and the strain-transferring filler.

Figures 2A, 2B:
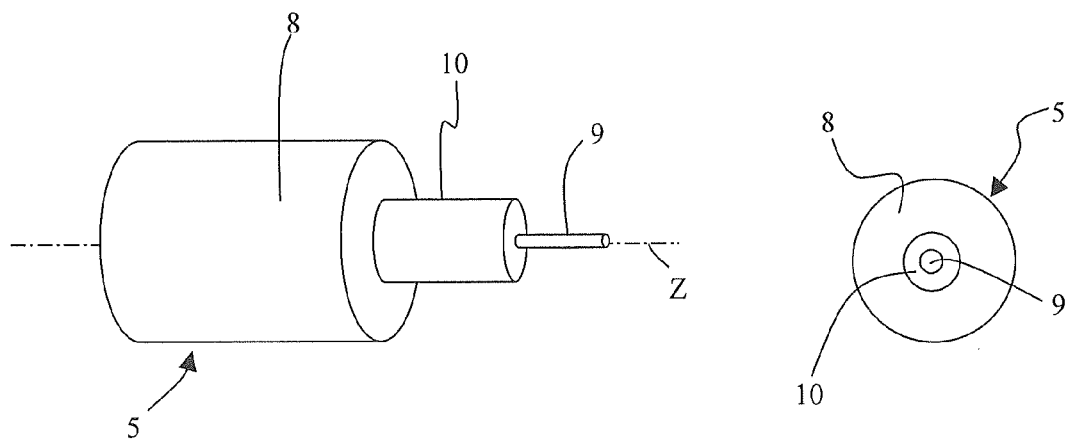

FIGS. 2a and 2b illustrate a partial perspective view and a cross-section, respectively, of a strain sensor 5 integrated in the electric cable of FIGS. 1a and 1b, according to a preferred embodiment of the present invention. The strain sensor 5 comprises an optical fibre 9 that is substantially arranged along the longitudinal axis Z, when the strain sensor is integrated in the cable. Fibre 9 of strain sensor 5 is an optical fibre, namely a silica-based optical fibre, with typical nominal diameter of 125 µm, coated by a primary coating, which is surrounded by a secondary coating, which typically adherently contacts the primary coating, where the primary and secondary coating form a coating system. The outer diameter of the (coated) optical fibre can be 250+/−10 µm or 200+/−10 µm. Single-layer coating systems can be used as well. Preferably, the optical fibre 9 is a single-mode optical fibre, such as a transmission fibre compliant with G.652, G.653, or G.655 ITU-T (International Telecommunications Union, ITU Telecommunication Sector) recommendations. In an embodiment, the strain optical fibre is a pure-silica core fibre.

Preferably, the optical fibre of the strain sensor has enhanced bending performance, exhibiting low bending losses. In some embodiments, the optical fibre is compliant to the G.657 ITU-T recommendations.

For identification purpose, it can be advantageous having a coloured optical fibre; in this case it is preferred to use an optical fibre with a coloured secondary coating. Advantageously, any colour other than white can be selected.

The Applicant has observed that the optical fibre of the strain sensor is capable to withstand repeated elongations up to 1%, preferably up to 2%, for a number of times exceeding the movement cycles expected to occur in the cable during its operating life. It is noted that the value of strain of 1% is larger than the typical maximum elongations an electric cable can bear before rupture or permanent damage, e.g., 0.5-0.7%. The coating system can be made of two different UV-cured acrylate material up to a diameter of 250 µm. In one embodiment, the coating system of the glass fibre is as disclosed in EP 1 497 686, which was observed to provide the optical fibre with no rupture when subject to repeated elongations exceeding 2%.

In preferred embodiments, the optical fibre 9 is tight-buffered with a buffer layer 10 surrounding the coating system for improving mechanical protection of the optical fibre, e.g. against microbending losses. The Applicant has understood that uniform adherence of the buffer layer to the optical fibre, namely to the coating system of the fibre, is particularly important for ensuring mechanical congruence between the optical fibre and the strain-transferring filler.

For example, the buffer layer 10 is extruded or applied over the 250 µm-coated fibre, increasing the outside diameter up to 600-1000 µm, with typical values of 800-900 µm. Preferably, the buffer layer is made of a material having elastic properties that permit the tight-buffered optical fibre to bear elongations of up to and including 2%.

Advantageously, the buffer layer is selected so as to adhere to the coating system of the optical fibre with essentially no creeping, slipping or debonding. Preferably, the buffer layer is based on a thermal resistant material capable of exhibiting thermal resistance sufficient to withstand the thermal treatments taking place during cable manufacturing.

Preferably, the buffer layer is made of a radiation curable acrylate polymer.

For example, the tight buffer is made of a UV-curable acrylate polymer such that described in WO 2005/035461, or of a polymeric matrix charged with a flame retardant filler such that described in WO 2008/037291.

An adhesion-promoting layer can be provided between the optical fibre coating system and the tight buffer layer.

Applicant has observed that it would be advantageous that the optical fibre of the strain sensor is shielded against lateral loads, which can give rise to microbending losses and thus can affect the Brillouin frequency shift measured in the fibre. Furthermore, as described above, when the fibre is influenced by lateral compression, the strain sensor can provide a measurement of the tensile strain that is not directly correlated with the effective elongation of the electric cable. To this end, a protective sheath 8, designed to improve resistance to lateral compressions, can be advantageously provided to surround the optionally tight buffered optical fibre.

In round cables, such as that illustrated in FIGS. 1a and 1b, lateral compressions in directions transverse to the longitudinal cable direction, typically occur in radially inward directions.

Applicant has observed that the strain sensor can be used as pulling strength member in the step of extrusion of the strain-transferring filler during the cable manufacturing process. To this end, it has been observed that is important that the strain sensor material does not soften during the extrusion process of the strain-transferring filler, in order to guarantee a uniform pulling force. The presence of a protective sheath 8 and a suitable selection of the material forming said sheath can advantageously provide the strain sensor with a tensional strength sufficient to both improve resistance to lateral compression and to allow the strain sensor to function as pulling strength member in the manufacturing process of the electric cable.

In order to ensure mechanical congruence between the optical fibre and the strain-transferring filler, the material of the protective sheath is selected so as to provide strong and relatively uniform adhesion with the optionally buffered optical fibre.

In preferred embodiments, the protective sheath 8 is made of a fibre-reinforced composite, wherein the fibres can be carbon, graphite, boron, or glass (non optical) fibres.

In an embodiment, the protective sheath 8 is a glass-reinforced polymer (GRP), in which the polymer is reinforced by glass fibres embedded in the polymer. It has been observed that advantageously relatively high tensional stiffness of the strain sensor is achieved by the presence of reinforcing fibres deployed parallel to the optical fibre longitudinal axis, thereby preventing lateral compression to be misread as tensile strain. The protective sheath 8 can be pultruded onto the buffer layer 10 and is in direct contact thereto.

Optionally, the outer surface of the protective sheath, which is surrounded by the strain-transferring filler in which the strain sensor is embedded, comprises a plurality of grooves or cuts or is treated to form a rough surface in order to increase the adherence of the protective sheath with the strain-transferring filler. Alternatively or in addition, an adhesion promoting layer can be optionally provided on the protective sheath.

As described above, the strain sensor should have an elastic response to return to its original condition after tensile loads, which are associated with the maximum expected cable strain, are removed from the electric cable. In order to provide the strain sensor with the required flexibility, it is preferred that the protective sheath is made of a polymeric-based material having elastic properties. Preferably, the polymer embedding the reinforcing fibres are cross-linked resins, in particular UV-curable cross linked resins or thermosetting cross linked resins, which in general provide for a resistance to compressions. The cross-linked resins can be unsaturated polyesters, epoxies, or vinyl esters.

It has been observed that, in order to improve flexibility of the strain sensor, the thickness of the protective sheath, when made of polymeric-based material, is preferably comprised between 500 and 1000 μm. For example, the protective sheath is a GRP layer that increases the outer diameter of the buffered optical fibre up to 1.8-2.5 mm.

It is preferred that the protective sheath surrounding the optical fibre of the sensor prevents fibre shrinkage at temperatures used in the manufacturing process, and in particular in the curing process of some cable components, such as the inner and outer sheaths.

High-temperature grade cross-linked resins withstanding the curing temperature are selected, for example, high temperature Polystal® GRP by Polystal Composites GmbH.

According to an aspect, the present invention relates to a strain sensor comprising an optical fibre, a buffer layer tightly enclosing the optical fibre and a protective sheath surrounding the buffer layer, wherein the buffer layer is made of a thermal resistant material, preferably of a radiation curable acrylate polymer, and the protective sheath is made of a fibre-reinforced composite. Preferably, the fibre-reinforced composite is reinforced with reinforced fibres embedded in a cross-linked resin. Preferably, the buffer layer is made of a UV-curable acrylate polymer.

Preferably, in order to enable the strain sensor to detect also small compressions of the electric cable, the buffered optical fibre is placed in the fibre-reinforced composite with a slightly stretched condition corresponding to a pre-elongation of 0.2%.

The strain sensor can detect a relatively large range of measurable elongations, in particular from −0.2% to 1%. Since elongations as high as 1% can be measured and considering that macroscopic rupture of cable takes place for elongations of 0.5-0.7% and generally smaller than 1%, the strain sensor according to the invention is capable of detecting a permanent deformation of the electric cable, once the maximum allowable strain has been measured at a position of the cable.

The strain transfers at least partially from one layer to the next, thereby ensuring a reliable measurement of cable elongations within a relatively large range, and at the same time an elastic return to the substantially unstrained condition upon removal of the tensile loads, at least in the range of tensile loads below permanent deformation of the cable. Due to a proper selection of the materials of the strain sensor and the strain-transferring filler, which provide mechanical congruence between the different elements, an efficient strain transfer and a knowable relation between the fibre elongation and cable strain are ensured. In some cases, the strain transfer from the radially external longitudinal structural elements of the electric cable to the optical fibre of the strain sensor is expected to range from 50% to 100%.

In above described preferred embodiments, the strain sensor comprises an optical fibre covered by layers (i.e., tight buffer, protective sheath) exhibiting elastic properties and embedded in a strain-transferring filler with elastic properties. However, as long as the structure composed by the strain sensor and the strain-transferring filler is capable of recovering the elongation in the reversible elastic regime of the cable, at least one of the layers selected from the group consisting of the buffer layer surrounding the coated fibre, the protective sheath and the strain-transferring filler can exhibit a non-elastic behaviour and in particular a plastic behaviour. In particular, the at least one layer can be made of a plastic material, namely a material having the capability to deform in response to mechanical forces without fracture, at least until a certain threshold value of the external forces is not exceeded. The Applicant has understood that elastic response requires that (1) a layer made of substantially plastic material is congruent with at least one layer made of elastic material, and (2) the axial rigidity of the layer made of plastic material is smaller than the axial rigidity of the at least one layer made of elastic material to which the layer of plastic material is in contact with. The axial rigidity, typically measured in N, is the product of the Young's modulus and the cross-sectional area of the layer element. In this way, the layer made of substantially plastic material stretches along the elastic material on which it adheres or contacts with friction during cable elongation and is pulled back to its original position by the elastic material, provided that enough gripping force exists between the two layers.

For example, the protective sheath of the strain sensor is a fibre reinforced thermoplastic polymer having Young's modulus of 72,400 MPa, while the strain-transferring filler is a thermosetting elastomer having Young's modulus of 671 MPa. The cross-sectional area of the protective sheath is of 3.4 mm² and the cross-sectional area of the strain-transferring filler is of 75 mm², providing an axial rigidity of 250 kN for the protective sheath of and of 50 kN for the strain-transferring filler. If a fibre reinforced thermoplastic polymer has a good adhesion to the strain transferring filler and to the underlying layers, such as the buffer layer, the thermoplastic polymer takes along the strain-transferring filler, even if the cross-sectional area thereof is much smaller. It is to be noted that this would be true also if the strain-transferring filler is made of a thermoplastic polymer, provided that the above conditions (1) and (2) are satisfied, and where the layer with elastic properties is the buffer layer surrounded by the protective sheath.

In an embodiment, under the assumption that conditions (1) and (2) are fulfilled, the strain-transferring filler is selected from the group consisting of: polyester with Young's modulus of from 1 to 5 GPa, polyamide with Young's modulus of from 2 to 4 GPa, polyvinyl chloride (PVC) with Young's modulus of from 0.003 to 0.01 GPa, low-density polyethylene with Young's modulus of from 0.1 to 0.3 GPa, and high-density polyethylene with Young's modulus of from 0.4 to 1.2 GPa. Preferably, cross-linked polymeric materials are employed.

According to another embodiment, in order to provide the strain sensor with resistance to lateral loads and pulling strength, the protective sheath of the strain sensor can be a metallic tube surrounding the buffer layer of the optionally buffered optical fibre (embodiment not shown in the figures). In this case, the metallic tube contains a gel or gel-like material, optionally under pressure, capable of providing the sought mechanical congruence between metallic tube and the optical fibre contained therein. In a preferred embodiment, the metallic tube is made of steel.

Preferably, only one in the group consisting of the buffer layer surrounding the coated fibre, the protective sheath and the strain-transferring filler is made of a material with plastic properties.

Although in some preferred embodiments the strain sensor comprises a buffer layer in order to improve strength and elasticity of the strain sensor, as in the construction shown in FIGS. 2a and 2b, it is to be understood that the strain sensor can comprise an optical fibre coated with a coating system directly surrounded by a protective sheath.

The electric cable 1 preferably comprises a temperature sensor comprising an optical fibre 24 for measuring the internal temperature of the cable 1. The optical fibre 24 of the temperature sensor is in a loose buffer construction. In particular, in the embodiment illustrated in the figure, optical fibre 24 placed loosely inside a module 19 longitudinally enclosing the fibre, the module 19 being comprised in fibre optic element 3. The longitudinally extending module 19 contains excess optical fibre length per unit length of the tube optical fibre 24. The excess fibre length (EFL) is defined by the following relationship:

$$EFL = \frac{L_f - L_t}{L_t} \cdot 100 \quad (1)$$

wherein $L_f$ is the length of the optical fibre and $L_t$ is the length of the tube housing the fibre. The excess length is selected so that the optical fibre remains loose (i.e., not strained) at the maximum strain imparted to the electric cable, for example 1%.

The optical fibre 24 of the temperature sensor is preferably a single-mode fibre and temperature is measured by using Brillouin backscattering techniques. However, use of a multimode optical fibre can be envisaged for temperature detection. In the latter case, temperature measurement can be carried out by using known techniques based on Raman scattering. Preferably, the optical fibre 24 is helically wound with respect to a central longitudinal axis extending along the cable. For example, optical fibre 24 is twisted around a longitudinal member. In case of an electric cable comprising an optical fibre element comprising more than one optical fibre, two fibres can be helically wound around each other along a longitudinal direction, one of the two fibres being employed as optical fibre of the temperature sensor. The optical fibre 24, being free from mechanical stresses, is only influenced by thermal expansion and can be used for temperature monitoring. When measuring the strain by means of Brillouin backscattering techniques, the strain optical fibre is affected by both the strain and the temperature changes. The temperature contribution can be subtracted by optically coupling the optical fibre 24 with the strain optical fibre and by measuring the temperature changes in the optical fibre 24.

Although it is preferred that mechanical coupling between the strain sensor and the longitudinal structural elements occurs also when the electric cable is in a substantially unstrained condition, in order to improve the detection sensitivity and the resolution of the strain measurements, mechanical coupling, and in particular mechanical congruence, between the strain sensor and the longitudinal structural elements may take place only when at least one of the longitudinal structural elements is subject to a tensile load and becomes in contact with the strain-transferring filler. For instance, mechanical coupling occurs when longitudinal structural elements undergo tensile loads corresponding to elongations of at least 0.1%.

Figure 3:
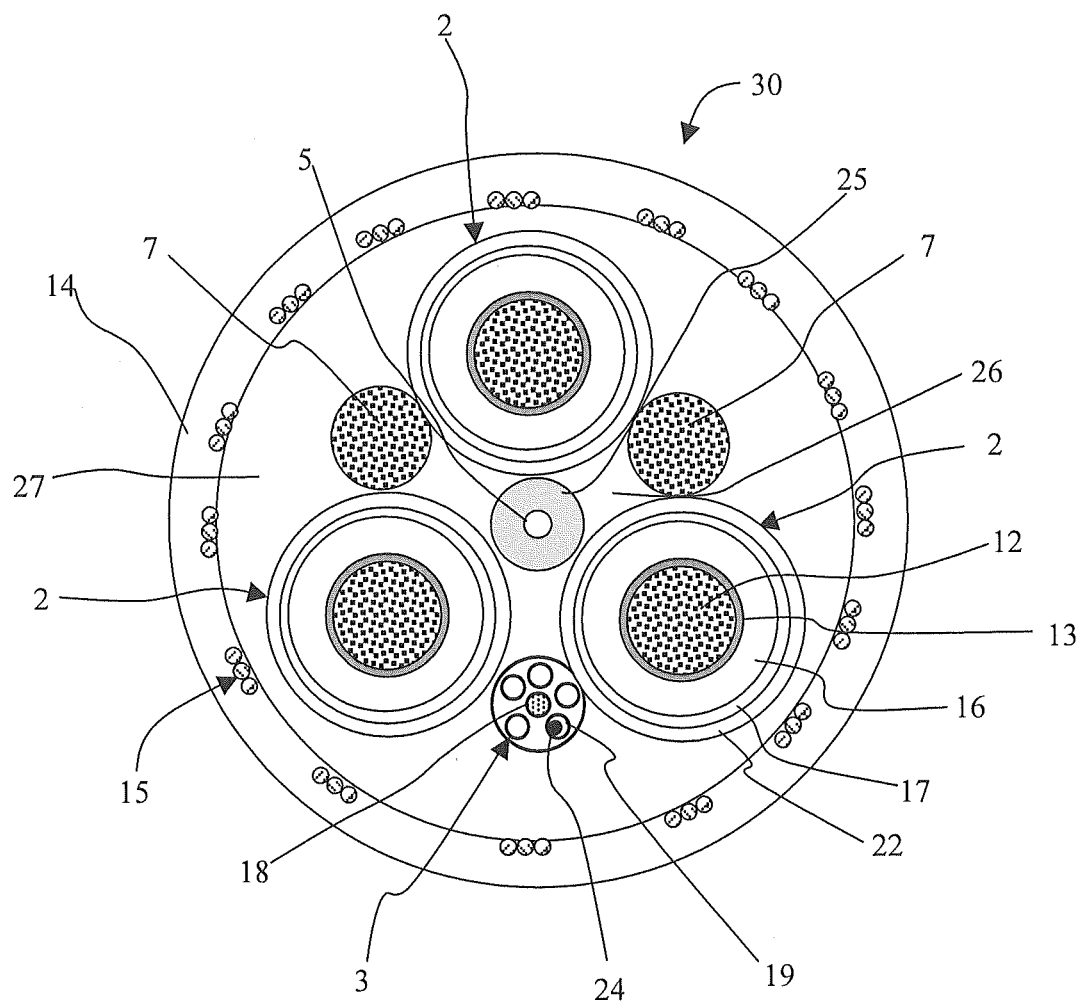
FIG. 3 is a schematic cross-sectional view of an electric cable, according to a further embodiment of the present invention.

FIG. 3 is a cross-sectional view of an electric cable, according to a further embodiment of the present invention. Same numbers are used to identify like components having the same or similar functions to the elements of FIG. 1b. While the embodiment in FIGS. 1a and 1b includes a strain-transferring filler contacting the longitudinal structural elements of the cable also in the absence of tensile loads, in the embodiment shown in FIG. 3, the strain transferring filler does not contact, at least non completely, the surface of the longitudinal structural elements when the cable is in a substantially unstrained condition, e.g., the original condition of the cable, before installation or use in a mobile equipment. In particular, electric cable 30 comprises a strain sensor 5 surrounded by a strain-transferring filler 25, which is preferably directly extruded over the strain sensor, e.g., with reference to FIGS. 2a and 2b, onto the outer surface of the protective sheath 8. The strain-transferring filler 25 may have a circular cross-section. For example, protective sheath 25 has a thickness of from 2 to 7 mm. The interstitial space 26 between the strain-transferring filler 25 and the radially external longitudinal structural elements, namely cores 2, and, if present, earth conductors 7 and optical fibre element 3, can be filled by the same material of the polymeric filler 27 surrounding the longitudinal structural elements, for example an EPR-based compound.

Because of the size thereof, the strain sensor 5 buffered with the strain-transferring filler 25 is relatively free to move in the interstitial space 26 between the strain-transferring filler 26 and the cable longitudinal structural elements, the mobility of the strain sensor depending also on the viscosity of the material filling the interstitial space. Upon the application of a tensile force, the longitudinal structural elements tend to compress radially inwardly, thereby reducing the radial distance to the longitudinal axis along which the strain sensor is arranged. When the value of the tensile force experienced by the cable is above a certain threshold, the longitudinal structural elements are pressed radially inwardly and establish contact with the strain-transferring filler 25. On the contrary, when the cable elongates in any longitudinal position of the cable length below that threshold, the optical fibre of the strain sensor 5 follows the cable movement with a delay due to the relatively poor grip with the longitudinal structural elements of the cable. Preferably, the threshold in the tensile force is of 0.1%.

The material properties of the strain-transferring filler 25 are those described above with reference to FIGS. 1 and 1b.

Figure 4:
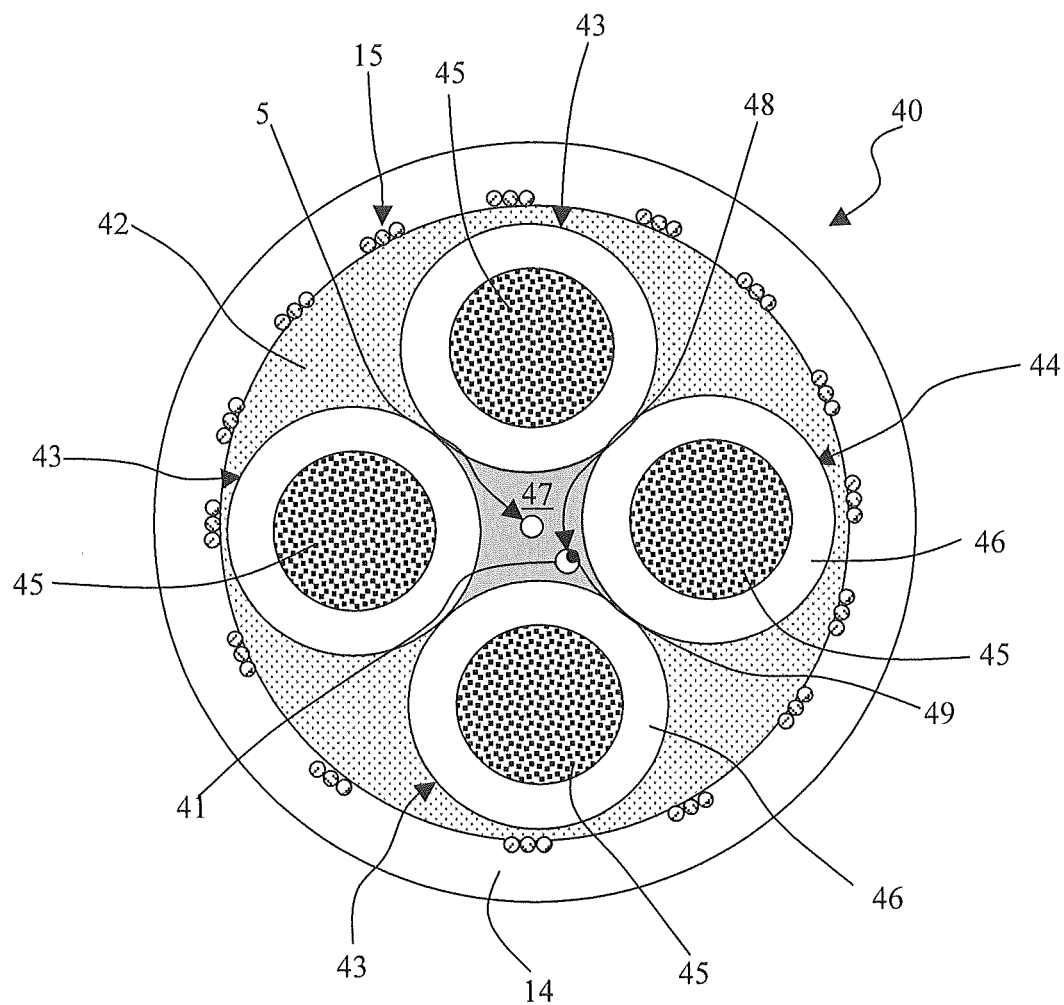
FIG. 4 is a schematic cross-sectional view of an electric cable, according to still another embodiment of the present invention.

FIG. 4 is a cross-sectional view of an electric cable, according to a further embodiment of the present invention. Same numbers are used to identify like components having the same or similar functions to the elements of FIGS. 1a and 1b. Electric cable 40 comprises four longitudinal structural elements, namely three power cores 43 and an earth conductor 44, being arranged radially external with respect to the strain sensor 5, which can have the construction described with reference to FIGS. 2a and 2b. Power cores 43 and earth conductor 44 comprise each a conductor 45, for example in form of a bundle of stranded tinned or bare copper electrical wires, surrounded by an insulating polymeric layer 46. The strain-transferring filler 47 embeds the strain sensor 5 and fills the interstices between the strain sensor and the longitudinal structural elements. Properties and geometrical shape of the strain-transferring filler 47 are such that mechanical coupling, and in particular mechanical congruence, exists between the longitudinal structural elements 43 and 44 and the strain sensor 5, also in an unstrained condition of the cable.

Cable 40 can be a 1 kV power cable, such as for vertical reeling applications. In the embodiment shown in FIG. 4, a temperature sensor 48 is integrated in a region radially internal to the longitudinal structural elements, and in particular within the strain-transferring filler 47. The temperature sensor 48 comprises an optical fibre 49, which is preferably a single-mode optical fibre, loosely disposed in a longitudinally extending module 41, which is preferably made of ETFE or PBT. The outer diameter of the module 41 is, for instance, of 2 mm.

Alternatively, the temperature sensor can be integrated in a peripheral area of the electric cable cross-section, radially external to the longitudinal structural elements.

Figure 5:
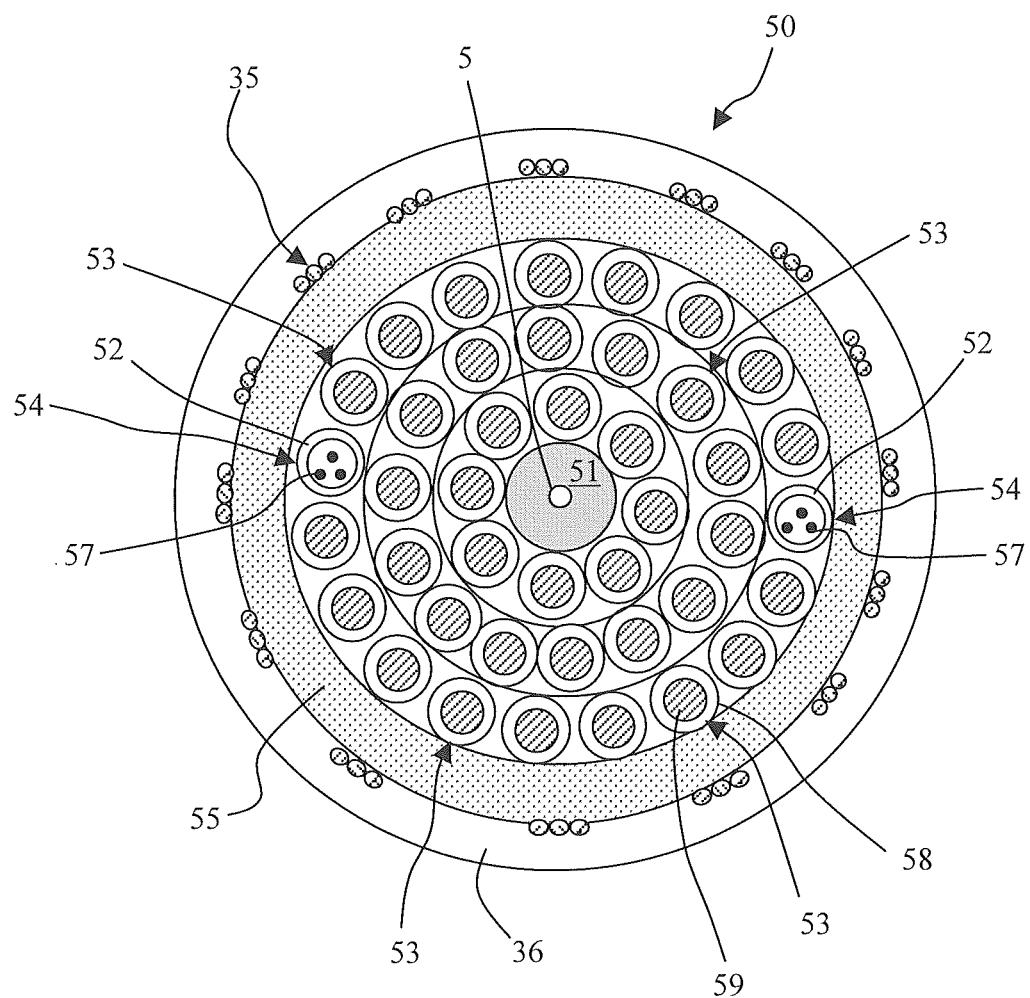
FIG. 5 is a schematic cross-sectional view of an electric cable, according to still another embodiment of the present invention.

FIG. 5 is a cross-sectional view of an electric cable, according to a further embodiment of the present invention. The illustrated cable can be for example a low-voltage control cable for reeling applications. Electric cable 50 comprises a plurality of longitudinal structural elements arranged in a plurality of concentric layers stranded around a central element 51 acting as strain-transferring filler for the strain sensor 5. The longitudinal structural elements of each concentric layer are twisted around the central element 51 and comprise control cores 53 and a pair of optical fibre elements 54 disposed in the most external concentric layer. Each control core 53 comprises a fine-wired copper conductor 59 surrounded by an insulating polymeric layer 58. The two optical fibre elements 54 are in the form of a longitudinally extending module 52 containing at least one optical fibre 57 (three optical fibres in the figure) loosely disposed within the module. An optical fibre of either of the optical fibre elements 54 can be used as temperature sensor. A polymeric inner sheath 55 surrounds the concentric layers of longitudinal structural elements. An outer jacket 36 with an embedded reinforcement, such as a polyester-yarn braid 35, surrounds the inner sheath 55 and encloses the cable.

The strain sensor 5 is arranged in the neutral region of the cable surrounding the central longitudinal axis. For example, the neutral region is a radial region, which extends along the central longitudinal axis, with radius of 3 mm for a cable having $\rho_{min}$ of 120 mm.

In the embodiments shown with reference to FIGS. 1, 3, 4 and 5, the longitudinal structural elements of the electric cable are in direct mechanical coupling with the strain-transferring filler, i.e., there is mechanical congruence between the longitudinal structural elements and the strain-transferring filler, in a strained condition. The resulting cable construction enables an effective and quick transfer of the strain experienced by the longitudinal structural elements, such as the cores or the earth conductors, to the strain sensor. The fast reaction to strain variations allows the detection of dynamic tensile forces, occurring for instance in abrupt changes of winding directions or load/unload movements of the mobile equipments.

It is to be understood that the electric cable according to the teaching of the present invention allows the detection of strain, also when originating from portions of the cable not in direct contact with the strain-transferring filler, such as the cable inner sheath or outer sheath.

Furthermore, the present invention encompasses an electric cable comprising a plurality of longitudinal structural elements and a strain sensor embedded in strain-transferring filler, wherein at least one of the longitudinal structural elements is in direct mechanical coupling with the strain-transferring filler.

If a substantially constant tensile force is applied to one longitudinal structural element of the cable during a given time interval, said force determines a strain to all longitudinal structural elements integrated in the cable, dependent on the friction and elasticity of the in-between elements/layers, which are in mechanical coupling with the strained longitudinal structural element, e.g., to the elements that are in direct contact with the strained longitudinal structural element or a mechanical coupling occurs across a material, such as a polymeric sheath, that separated the other elements from the strained element. The larger is the contact area and the higher the friction between elements (depending also on the value of the tensile force), the shorter is the longitudinal length portion of the cable required to have a uniform strain between the longitudinal structural elements. The longitudinal length portion necessary to have strain distributed on the entire cable cross-section is of the order of five cable diameters, thus typically not more than 20-40 cm, for heavy-duty cables for mobile equipments. The strain value acting in different portions of the cross section depends on the elastic properties of the constituting materials.

In case of the application of a tensile force variable with time, such as in dynamic strain measurements, to one longitudinal structural element of the electric cable, the cable structure, taking into account the friction between elements, strong adherence between the layers, and thus a suitable selection of the materials composing the layers, becomes important.

Figure 6:
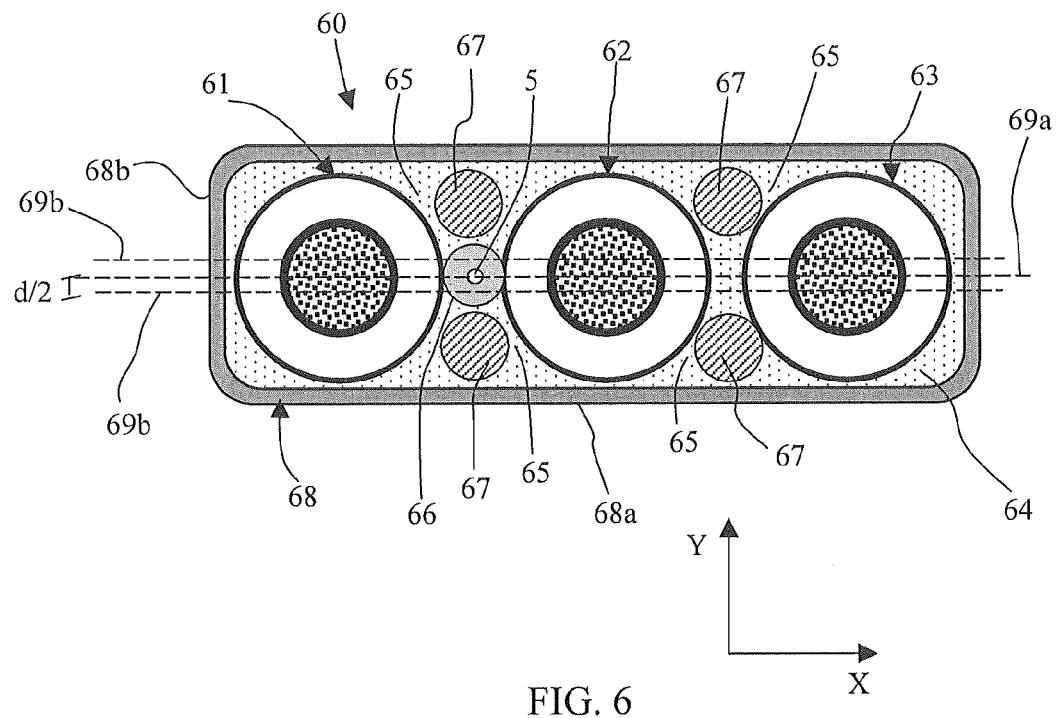
FIG. 6 is a schematic cross-sectional view of an electric flat cable, according to a further embodiment of the present invention.

FIG. 6 shows a schematic cross-sectional view of a three-phase electric flat cable 60, such as for applications in well pump systems, including two outer cores 61 and 63 and a central core 62. The cores are positioned substantially parallel and adjacent one to another, centred along a common axis 69a parallel to the X direction, transversal to the longitudinal cable axis. The axis 69a is the middle line of the cable cross-section in the plane (X,Y). An optic fibre strain sensor 5 is arranged between the central core 62 and one of the outer cores, in this case outer core 61. The strain sensor 5 can have the structure described with reference to FIGS. 2a and 2b. The strain sensor 5 is surrounded by a strain-transferring filler 66, which may have a circular shape and being adhered to the outer surface of the strain sensor. Radial thickness of the strain transferring filler 66 is selected in dependence to the lateral interstitial space between the lateral core 61 and the central core 62 and in such a way to provide with the necessary mechanical resistance. Preferably, the strain-transferring filler is mechanically coupled and in particular congruent with the outer surface of the adjacent cores 61 and 62, when the cable is in a substantially unstrained condition.

The neutral axis for bending of cable 60 is the middle axis 69a, which is the axis of symmetry of the cable cross-section along the Y axis. The strain sensor 5 is arranged within the neutral region for bending of thickness d, defined between two planes 69b parallel to the middle line 69a and distant d/2 in the Y axis from 69a. For flat cables with typical values of $\rho_{min}$ of 500 mm, the thickness d can range from 5 to 10 mm.

The flat cable 60 further comprises outer armour 68 arranged in an external position with respect to the cores and longitudinally enclosing them. The outer armour 68 has two substantially flat sides 68a parallel to the X axis and two opposite lateral sides 68b surrounding a portion of two outer cores 61 and 63. The outer armour 68 is preferably a tape armour of steel or of stainless steel or of a copper and nickel alloy.

The electric cable 60 has a plurality of interstitial spaces 65, which are defined by the spaces between the cores and the outer armour 68. Strength members 67 are arranged in interstitial spaces 65 in two common planes parallel to the X-axis. The strength members 67 have circular cross-section and can be made of steel, glass or reinforced polymers.

The free space between the cores and the strength members is filled with an inner sheath 64, made for instance of mineral filler charged polymeric compound, preferably extruded directly on the longitudinal structural elements of the flat cable.

Electric cables according to the invention can be monitored to determine the strain distributed along the cable by using Brillouin backscattering techniques, such as Brillouin optical time domain reflectometer (BOTDR), Brillouin optical time domain analysis (BOTDA), and Brillouin optical frequency domain reflectometer (BOFDR). According to the generally known measurement techniques, a first optical signal (probe) generated by a first laser is launched into a first end of the optical fibre of the strain sensor integrated in the electric cable and, concurrently, a second optical signal (pump) generated by a second laser or by the same first laser is launched into a second end of the optical fibre of the strain sensor, opposite to the first end. The first optical signal operates continuously, namely is a continuous wave (CW) signal, whereas the second optical signal is pulsed. The return optical signal backscattered from the first end of the optical fibre is measured by a detection circuit. When the difference between the optical frequency of the CW optical signal is greater than that of the pulsed optical signal by an amount equal to the Brillouin frequency shift at some point in the fibre, the pulsed signal is amplified through the Brillouin interaction and the CW signal experiences loss. The Brillouin frequency shift is both strain and temperature sensitive. Brillouin backscattering techniques have the advantage of being distributed sensing techniques, which thus allow the real-time monitoring of the actual strain profile along the cable length.

Brillouin scattering can be used to measure simultaneously changes in both temperature and strain along the length of the optical fibre of the strain sensor, with a sampling apparatus that maps the Brillouin spectrum by scanning the frequency shift of the two laser sources and fitting the Brillouin peak to obtain the temperature and strain information. Such analysis can be carried out with a commercial type BOTDR apparatus, such as Foresigh™ sensor commercialised by OZ Optics Ltd. In this application, a temperature sensor arranged in a separate location in the cable from the strain sensor is not necessary for temperature sensing.

In some preferred embodiments, monitoring of strain and temperature is performed by separating the temperature contribution from the strain contribution in the measured optical signal and by using a second optical fibre in loose buffer construction for temperature measurement, as described in some of the foregoing embodiments of electric cable.

Figure 7:
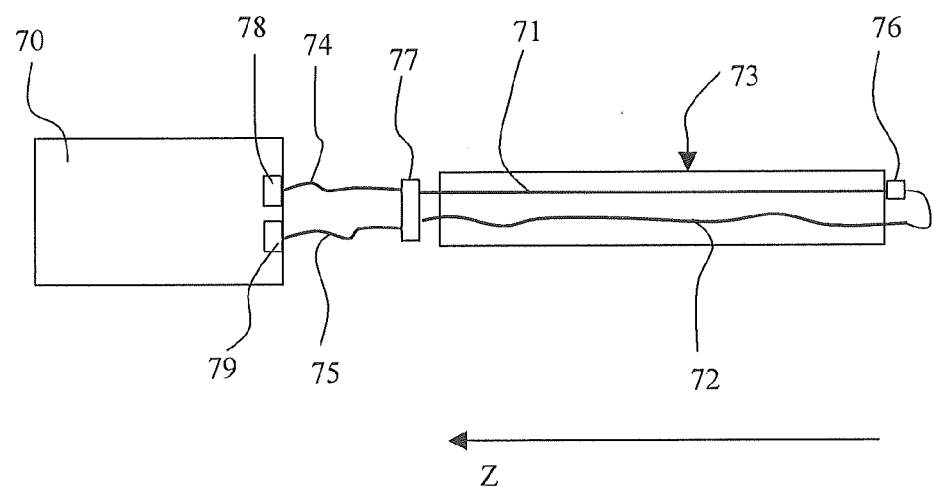
FIG. 7 is a schematic diagram for illustrating the operating principles of a Brillouin-based backscattering technique in an electric cable according to an embodiment of the invention.

FIG. 7 is a schematic block diagram illustrating the operating principles of a monitoring system using the Brillouin-based backscattering techniques, such as BOTDR, to measure the strain and temperature changes over the electric cable length. A sampling apparatus 70 is used to inject optical signals in an electric cable 73 and to analyse the backscattered optical signal received from the cable. For example, the sampling apparatus can be a DITEST-DSM system commercialised by Omnisens SA. The electric cable comprises a strain sensor comprising an optical fibre 71 extending along the cable longitudinal direction Z and a temperature (sensor) optical fibre 72 (only the strain and temperature fibres are schematically represented in the figure). The strain sensor comprising a strain optical fibre 71 is mechanically coupled to at least one longitudinal structural element of the cable 73 in such a way to allow strain transfer from the at least one longitudinal structural element to the strain sensor, whereas the optical fibre 72 for temperature sensing is integrated in the cable in a loose configuration. The electric cable 73, and in particular the arrangement of optical fibres 71 and 72 within the cable, can have a structure as any of those described in the foregoing embodiments. Strain optical fibre 71 is located in a longitudinal neutral bending region of the cable and has mechanical congruence with at least one longitudinal structural elements of the cable, whereas temperature optical fibre 72 is arranged in a loose buffer construction in order not to be affected by the strain applied to the cable. The sampling apparatus 70 launches a pump optical signal from a first output 78 to an optical cable section 74 connected to a proximal end of the strain optical fibre 71. Simultaneously, a probe optical signal is launched from a second optical output 79 into an optical cable section 75 connected to a proximal end of the temperature optical fibre 72. The terms "proximal" and "distal" for the fibre ends are referred with respect to the sampling apparatus, or at least to the optical connection with the sampling apparatus. However, such terms are intended to indicate only a relative position and/or are used to facilitate the description of the drawings, but they are not to be construed as having an absolute meaning Non-permanent connection between the cable sections 74 and 75 of the measurement apparatus 70 to the respective optical fibres 71 and 72 can be made by conventional means, for instance through an optical connector 77. At least one of the strain and temperature optical fibres 71 and 72, and preferably both fibres, have a length extending beyond the proximal and distal ends of the cable 73. At the ends of the optical fibres proximal to the sampling apparatus 70, this simplifies connection to the apparatus. The distal ends, opposite to the proximal ends, of the optical fibres projecting from the cable are connected one to another so as to produce a fibre loop with two input/output ends at only one end (i.e., the proximal end) of the cable. At the distal ends, the two fibres can be joined together by fusion splicing in a splicer 76 according to conventional methods.

The Brillouin backscattered optical signal exits from the temperature sensor fibre 72, enters the sampling apparatus 70 and can be processed in order to determine the strain and temperature variations along the cable. By considering the fibre loop comprising the strain optical fibre 71 and the temperature fibre 72, the position at which the measured strain and temperatures are located along the fibre loop and thus within each of the two sensing fibres can be determined by the time of flight of a pulse to propagate down and back through the fibre loop.

The optical fibre loop can be calibrated by using known techniques, such as by using OTDR techniques, in order to know the position of the connectors and/or the optical joints in the fibre loop and thus to determine the position and length of the temperature and strain optical fibres within the fibre loop.

The strain optical fibre 71 is affected by both the strain and the temperature changes, whereas the temperature optical fibre 72, being in a loose configuration within the cable structure, is affected only by temperature. By subtracting the temperature contribution along the fibre loop section corresponding to the optical fibre 72 integrated in the cable, it is possible to determine the contribution to the Brillouin frequency shift caused only by strain.

In an embodiment, a mirror can be positioned at the distal end of the temperature optical fibre with respect to the sampling apparatus, and both pump and probe optical signals are launched into the proximal end of the temperature optical fibre. This solution (not shown in the figures) does not require a fibre loop between the strain and temperature optical fibres for the measurement.

The correlation between the strain in the strain optical fibre and the strain in the electric cable including the strain optical fibre can be determined by the manufacturer using a strain calibration fixture, which is capable of imposing a known amount of longitudinal elongation to the cable. By means of a Brillouin scattering technique, the optical fibre is analysed in order to determine the elongation in the fibre from the cable at rest position and subject to a known amount of elongation. For instance, to a $(\Delta U L)_{cable}$ of 1% corresponds a $(\Delta L/L)_{fibre}$ of 0.75%, indicating a 75% strain transfer from the cable to the fibre when the cable is subject to a uniform and "static" elongation.

The Applicant has observed that costs of a Brillouin sampling apparatus, especially if wide-range high-sensitivity measurements are required, is relatively high and therefore it would advantageous to provide for a monitoring system of a plurality of electric cables in order to reduce the overall cost.

The Applicant has further noted that real-time monitoring of heavy-duty cables would allow to record dynamic events that induce elastic strain peaks, which can damage the cable by fatigue.

Figure 8:
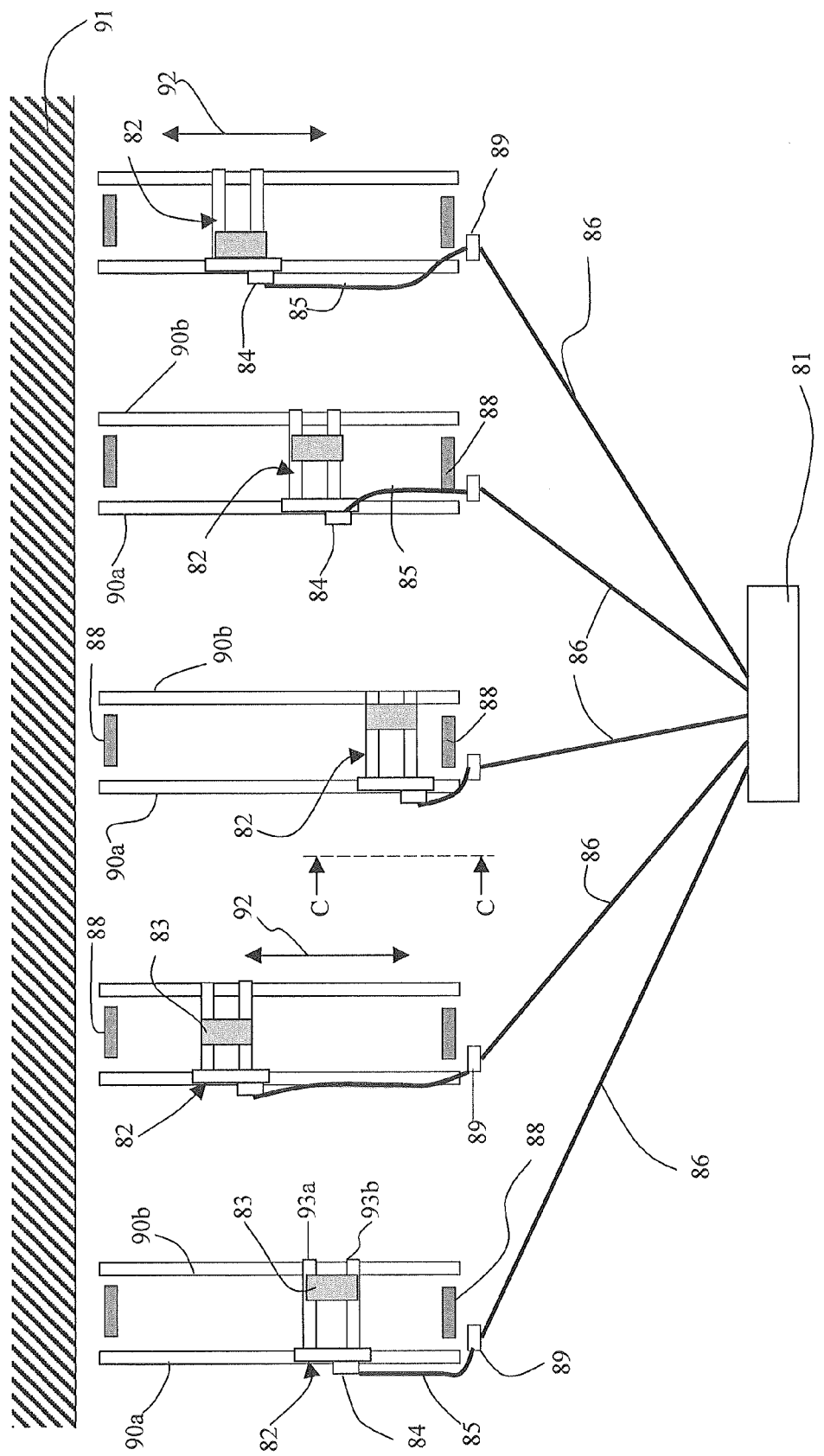
FIG. 8 is a diagrammatic representation of a monitoring system of strain and temperature of a plurality of heavy-duty cables mounted in mobile equipments, according to an embodiment of the present invention.

FIG. 8 is a schematic illustration of a monitoring system of a plurality of heavy duty cables in an area for the movements of goods, such as a container terminal in a port. The container terminal is a port facility generally covering a vast area across which containers (not shown in the figure) are stored to be loaded to the ships or to be collected from the harbour. A plurality of heavy duty cranes 82 move across a selected area of the terminal to lift and transfer containers while being powered and controlled from a power deliver station 81. Heavy duty cranes 82 can be gantry cranes fixed on a pair of rails 90a and 90b installed on port areas behind the wharf, which is indicated in the figure with dashed area 91, where quay cranes for loading and unloading ships operate. Containers (not shown) are stacked in several rows within the space between the rails where can be hoisted and moved around by the gantry cranes running back and forth horizontally along the direction indicated by the double arrow 92.

Figure 9:
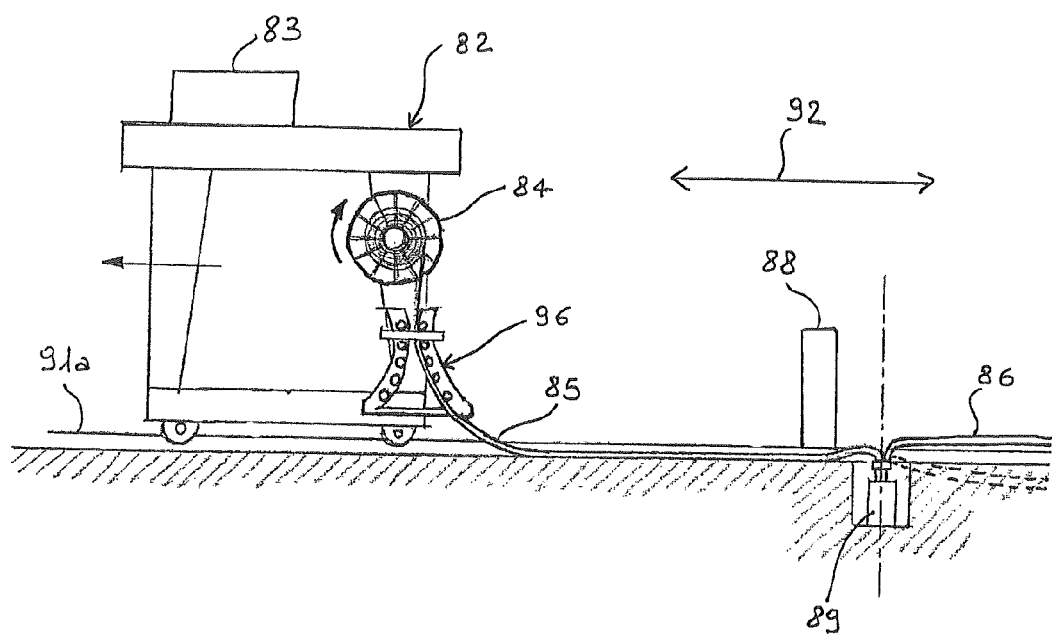
FIG. 9 is a partial lateral view along line C-C illustrating a heavy-duty crane of the monitoring system of FIG. 8.

FIG. 9 is a lateral view of a gantry crane of the plurality taken for instance along the C-C line of FIG. 8. The supporting structure of the gantry crane 82 comprises a bridge with two overhead rails 93a and 93b (not visible in FIG. 9) on which a winch trolley 83 moves perpendicular to the motion of the crane. According to conventional designs, the winch trolley 83 has a winch system (not shown) to hoist the containers.

End stoppers 88 can be provided at both ends of the rails so as to prevent the crane to move beyond the rail ends.

Each gantry crane 82 is powered by a respective electric cable 86, which can be a conventional power cable, connecting the power delivery station 81 to a crane supply unit 89. A heavy-duty cable 85 is connected to a crane supply unit 89 so as to take the power from carried by the respective electric cable 86 and to provide power for a variety of functions (movement, positioning, monitoring thereof, etc.) of the crane 82. In addition, heavy-duty cables receive the control/data electrical and/or optical signals Although the crane supply units are shown to be placed in the proximity of the rail end proximal to the power delivery station, other positions of the crane supply unit are possible, such as at a middle position alongside the rails with respect to the length of the rails.

The heavy-duty cable 85 is wound around a reel 84 fixed onto a lateral side of the crane structure. The cable reel 84 can be motorised so as to allow rotation of the reel in both directions. Guidance of the cable to the crane supply unit can be provided by a guidance device 96 (visible in FIG. 9), in the embodiment of the figure comprising two laterally oppositely arranged deflection guide rollers. Each cables 85 has one end fixed into the respective crane supply unit 89 and the opposite end fixed at the cable reel 84, typically at its centre, referred to as the feed centre. The heavy-duty cables 85 are then constrained at both ends when discontinuous and often abrupt winding and unwinding phases of the cable around the reel tale place during swift horizontal movements of the crane. Often, acceleration and deceleration of the crane does not occur synchronously with the winding or unwinding of the cable, thereby imposing repetitive spikes in the elongation of the cable.

In an embodiment, the heavy duty cables have a structure of the type described with reference to FIGS. 1a and 1b. In another embodiments, the heavy-duty cables have anyone of the structures described with reference to FIGS. 1a-1b, 3,4, and 5.

Referring again to FIGS. 8 and 9, each heavy-duty cable 85 comprises a strain sensor and a temperature sensor. The strain sensor comprises an optical fibre mechanically coupled to, and in particular mechanically congruent with, at least a longitudinal structural element of the cable, whereas the temperature sensor comprises an optical fibre integrated in the cable in a loose configuration. At least the optical fibre of the strain sensor, and preferably also the optical fibre of the temperature sensor, is a single mode optical fibre. Preferably, strain and temperature optical fibres are telecom-grade optical fibres.

Each of the electric feeding cables 86 bringing power to the heavy-duty cables 85 comprise an integrated optic fibre element including at least two optical fibres, preferably being arranged in a loose buffer construction along the feeding cable. On end of each optical fibre of the feeding cable 86 is optically connected to a Brillouin sampling apparatus (not shown in FIGS. 8 and 9), whereas the opposite end is optically connected to a respective end of the strain and temperature optical fibre comprised in the heavy-duty cable 84. Optical connection can take place in the power supply unit by conventional means. Therefore, heavy-duty cables 85 are enabled to receive power and the optical signals for the Brillouin analysis from the respective feeding cables 86. The Brillouin sampling apparatus can be housed in the power delivery station 81. Only for clarity in FIGS. 8 and 9, feeding cables 86 are illustrated to lie above ground. It is to be understood that feeding cables can reach the crane supply unit while running underground (represented by dashed lines in FIG. 9).

Figure 10:
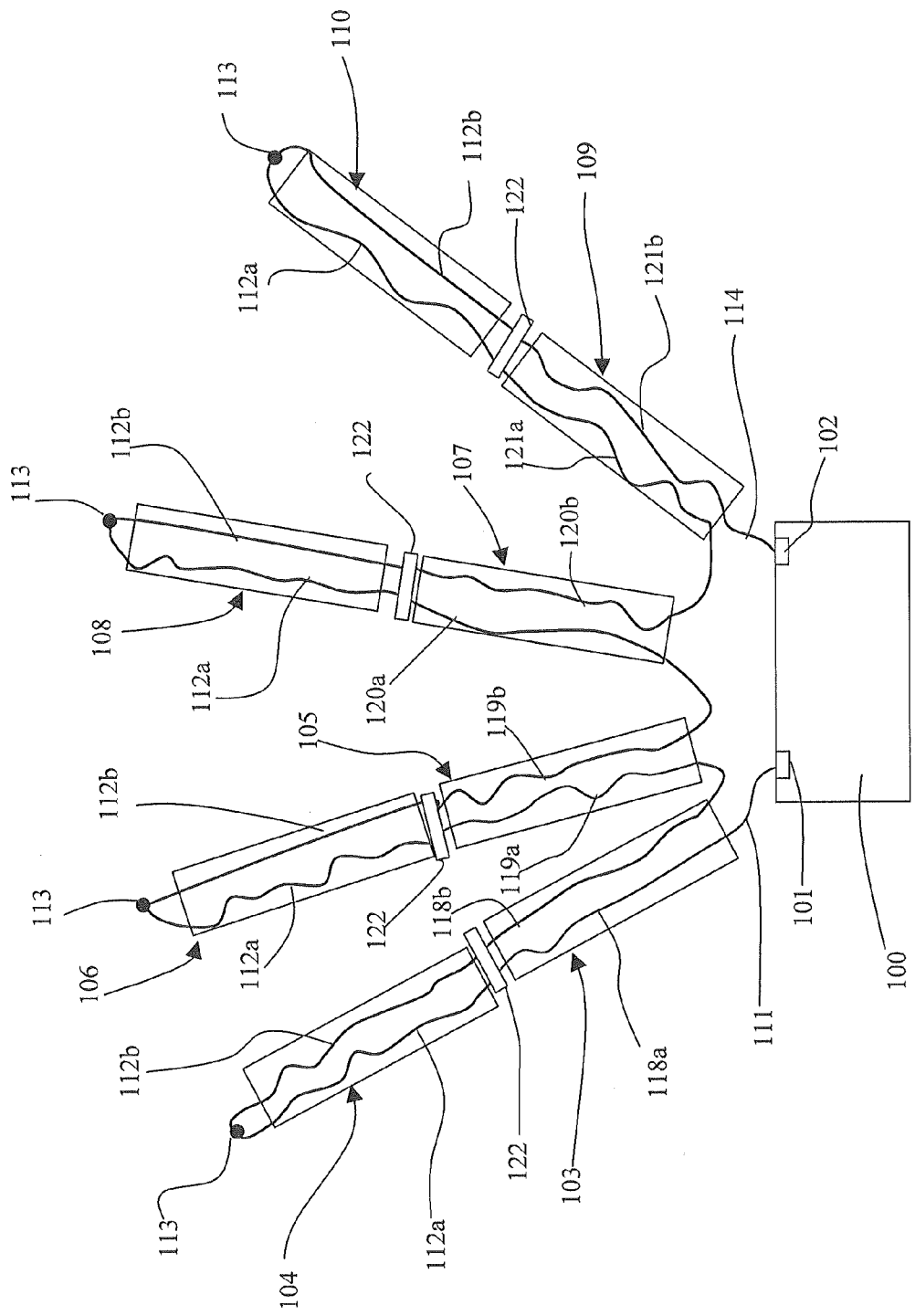
FIG. 10 is a schematic diagram illustrating the principles of operation of a monitoring system of a plurality of heavy-duty cables, in an embodiment of the present invention.

FIG. 10 is a schematic diagram illustrating the principles of operation of a monitoring system for controlling the strain and preferably the temperature of a plurality of heavy-duty cables mounted on mobile equipments, according to an embodiment. A plurality of feeding cables 103, 105, 107, and 109 comprise each first and second feeding optical fibres 118a and 118b, 119a and 119b, 120a and 120b, and 121a and 121b, respectively. Feeding cables 103, 105, 107, and 109 supply power, and preferably control signals, to respective heavy-duty cables 104, 106, 108, and 110, each heavy-duty cable comprising a strain sensor optical fibre 112a and a temperature sensor optical fibre 112b. First feeding optical fibres 118a, 119a, 120a and 121a are optically connected to the strain optical fibre 112a of the respective heavy duty cable 104, 106, 108 and 110. Second feeding optical fibres 118b, 119b, 120b and 121b are optically connected to the temperature optical fibre 112b of the respective heavy duty cable 104, 106, 108 and 110. Optical connection of the feeding optical fibres of the feeding cables with the strain and temperature optical fibres of the heavy-duty cables can be achieved by fusion splicing. The ends of the strain and temperature optical fibres 112a and 112b of each heavy-duty cable distal with respect to the respective feeding cable are connected one to another (indicated with connection point o device, e.g., a splicer 113) so as to form a fibre loop across the heavy-duty cable and the feeding cable. In the embodiment shown in FIGS. 8 and 9, the distal ends of the strain and temperature optical fibre are at the end of the heavy-duty cable engaged in the reel of the crane, e.g., in the feed centre of the reel.

A Brillouin sampling apparatus 100 emits a first optical signal (pump) from input/output optical port 101 and a second optical signal (probe) from input/output optical port 102. From input/output optical ports 101 and 102 signals are launched into a respective first and second optical fibre section 111 and 114. First optical section 111 is optically connected to the first feeding optical fibre 118a of feeding cable 103, which receives the pump signal, while the second fibre section 114 is optically connected to the second feeding optical fibre 121b of the last feeding cable 109, which receives the probe signal. The second feeding fibre 118b of the first feeding cable 103 is optically connected to the first feeding fibre 119a of the second feeding cable 104; the second feeding fibre 119b of the second feeding cable 104 is optically connected to the first feeding fibre 120a of the third feeding cable 105, and the second feeding fibre 120b of the third feeding cable 105 is optically connected to the first feeding fibre 121a of the second feeding cable 107. This produces a fibre loop having as open optical input/output one end proximal of the first feeding fibre 118a of the first feeding cable 103 and one end (the proximal end) of the second feeding fibre 121b of the fourth feeding cable 109. Referred to the drawings, the terms "proximal" and "distal" can be taken with reference to the sampling apparatus, or at least to the optical connection with the sampling apparatus. However, such terms are intended to indicate only a relative position and/or are used to facilitate the description, but they are not to be construed as having an absolute meaning Optical coupling of the optical fibres ends of two different feeding cables or one end of an optical fibre of a feeding cable with a fibre section optically connected to the sampling apparatus can be realised by conventional coupling devices, which are not indicated in the figure.

The number of heavy-duty cables connected to the Brillouin sampling apparatus shown in FIG. 10 is four. However, it is to be understood that that number can be different, depending on the optical loss induced by fibre attenuation and fibre length, the fusion splice loss, the mechanical splice loss, compared with Brillouin instrument dynamics. For example, up to 10 heavy-duty cables installed in respective cranes could be measured in a single fibre loop.

Feeding optical fibres are preferably telecom-grade single-mode optical fibres.

First and second optical signals are counter-propagating optical signals at a suitable amplitude and frequency to generate a Brillouin backscattering signal, which is analysed by the sampling apparatus 100. By knowing the fibre lengths of the fibres in the feeding cables and in the heavy-duty cables forming the fibre loop, for instance following calibration of the cabling configuration within the loop, it is possible to associate the strain variation to a location along the fibre loop, and thus to monitor the strain applied to each heavy-duty cable optically connected to the sampling apparatus.

According to an aspect of the present invention, the monitoring system for monitoring a plurality of electric cables, and in particular a plurality of heavy duty cables, comprising: a sampling apparatus for measuring spectral changes of Brillouin scattered light comprising a first and a second optical input/output port, the first input/output port being apt to emit a first optical signal and the second input/output port being apt to emit a second optical signal, and a plurality of heavy-duty cables including a first and a last heavy-duty cable, each cable of the plurality comprising a strain sensor including a strain optical fibre and a temperature sensor including a temperature optical fibre, the strain and temperature sensors extending longitudinally along the respective cable, the strain optical fibre and temperature optical fibres having proximal ends and distal ends, the proximal ends being positioned at a proximal end of the respective electric cable, wherein: the distal ends of the strain optical fibre and the temperature optical fibre of each heavy-duty cable are optically connected one to another, the proximal end of the strain optical fibre of the first heavy-duty cable is in optical communication with the first input/output of the sampling apparatus and the temperature optical fibre of the last electric cable is in optical communication with the second input/output port of the sampling apparatus, and the proximal end of the temperature optical fibre of the first heavy-duty cable is optically connected with the proximal end of the strain optical fibre of the last heavy-duty cable, so as to form an optical fibre loop in which the strain optical fibre and the temperature optical fibre of each heavy-duty cable of the plurality are in optical communication with both the first and the second input/output ports of the sampling apparatus and the first and second optical signals enters the optical fibre loop in opposite directions.

The Applicant has observed that a commercially available Brillouin sampling apparatus can be capable of measure the strain and temperature up to 20 km of optical fibre. When the cranes are scattered over a large area and spaced apart by a significant distance in a horizontal direction perpendicular to the running direction of the cranes, it may be not particularly efficient to connect to the same power delivery station housing the sampling apparatus largely spaced apart cranes. Furthermore, it would be advantageous to employ a typically pre-existing cabling configuration from the power delivery stations to the cranes.

Figure 11:
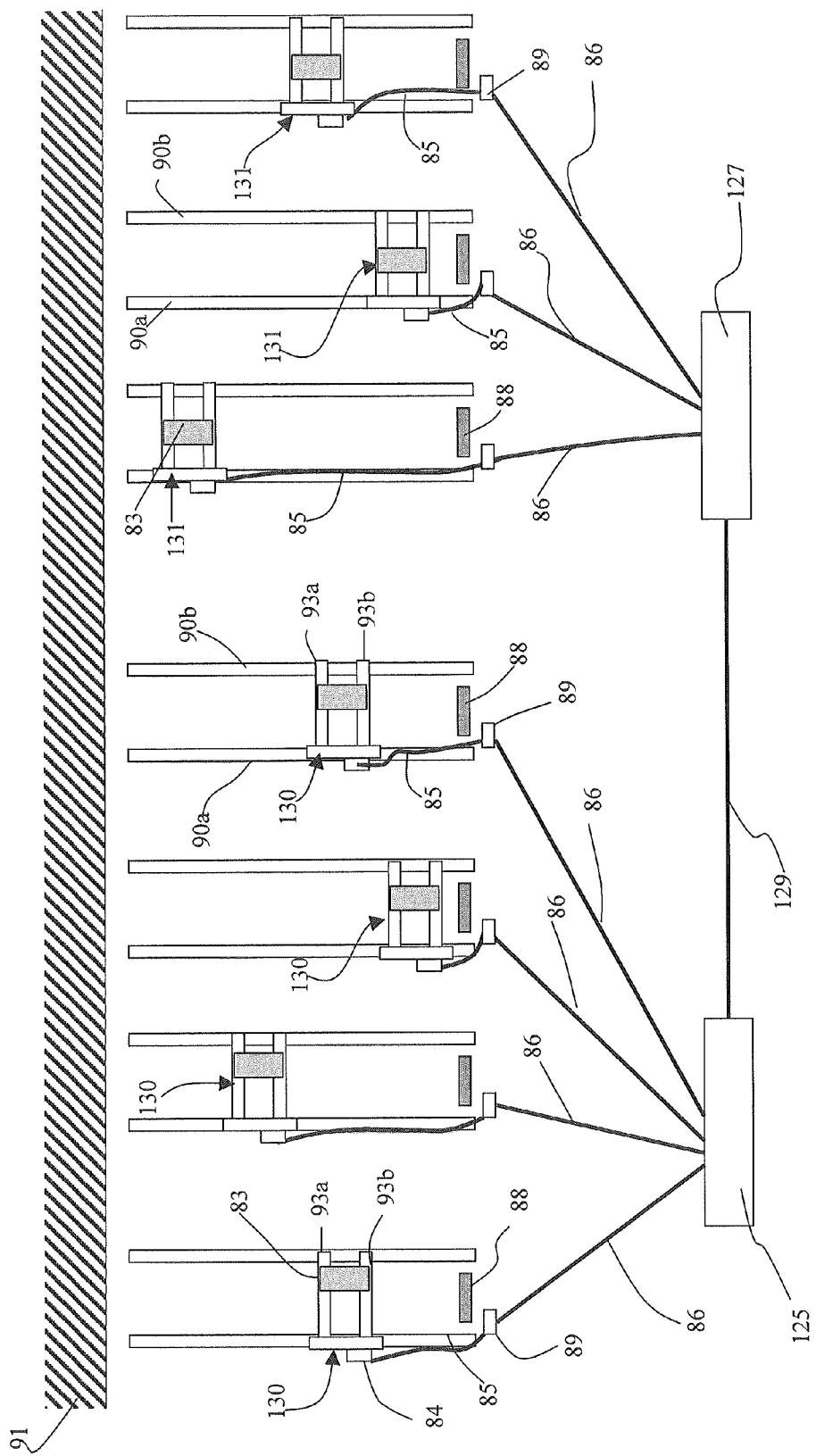
FIG. 11 is a diagrammatic representation of a monitoring system of strain and temperature of a plurality of heavy-duty cables mounted in mobile equipments, according to a further embodiment of the present invention.

FIG. 11 illustrates a monitoring system of a plurality of heavy duty cables in an area for the movements of goods, such as a container terminal in a port, according to a further embodiment of the present invention. Same numbers are used to identify like components having the same or similar functions to the elements of FIG. 8. Power delivery station 125 supplies power and control signals to a first group of cranes 130, while power delivery station 128 to a second group of cranes 131. Either of the power delivery stations houses a Brillouin sampling apparatus (not shown), which is optically connected to one of the feeding cables of the other power delivery station by an optical cable 129, comprising two optical fibres, which are preferably single-mode optical fibres. The number of cranes in each group is purely exemplary although the number may typically vary from 3 to 6.

Figure 12:
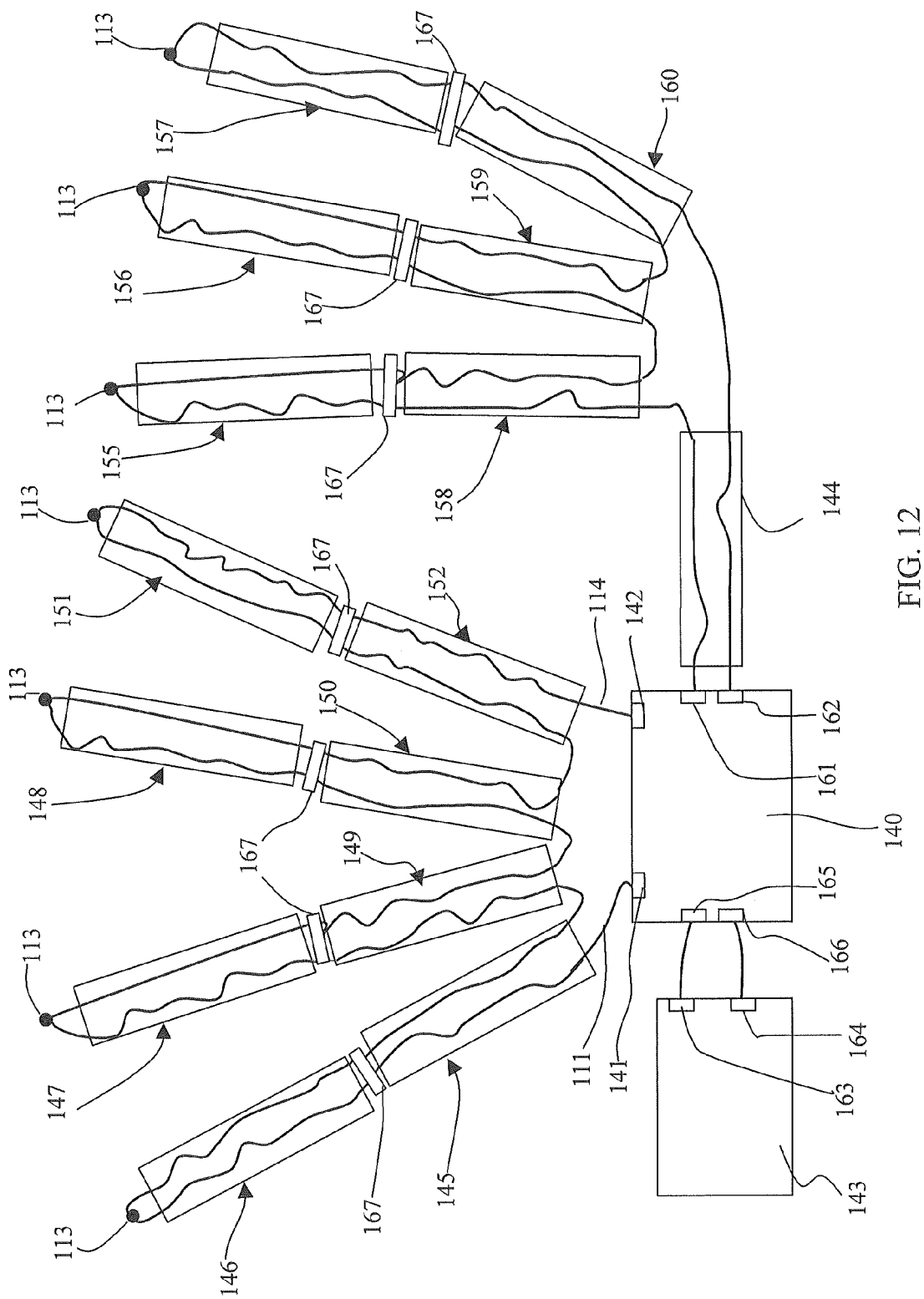
FIG. 12 is a schematic diagram illustrating the principles of operation of a monitoring system of a plurality of heavy-duty cables, in a further embodiment of the present invention.

A possible optical configuration of the monitoring system of FIG. 11 is illustrated in the schematic diagram of FIG. 12. A first group of feeding cables 145, 149, 150, and 152 comprise each first and second feeding optical fibres, which are optically connected to a respective strain and temperature optical fibres of respective heavy-duty cables 146, 147, 148 and 151 by known methods, such as by means of an optical connector 167. The first group of feeding cables receives power from a first power delivery station. A second group of feeding cables 158, 159, and 160 comprise each first and second feeding optical fibres, which are optically connected to a respective strain optical fibre and temperature optical of respective heavy-duty cables 155, 156 and 157. The second group of feeding cables receives power from a second power delivery station (not shown in FIG. 12). Two optical input/output ports 163 and 164 of a Brillouin sampling apparatus 143 are optically connected to a respective input port 165 and 166 of an optical switch 140. Input/output port 163 emits a first optical signal (pump), whereas Input/output port 164 emits a second optical signal (probe). With reference to FIG. 11, the sampling apparatus 143 and the optical switch 140 can be for instance housed in the first power delivery station 125. The optical switch 140 is apt to split and direct the received first optical signal to two input/output ports 141 and 161 and the received second optical signal to two input/output ports 142 and 162. The optical switch 140 can be of conventional type, for example a single mode fibre 1×2 or 1×4 or 1×8 optical switch.

The distal ends of the strain and temperature optical fibres of each heavy-duty cable of the first group are optically connected one to another (e.g., by means of a connector 113) so as to form a first fibre loop having as first open end the end of the first feeding fibre of the first feeding cable 145 and as second open end the end of the second feeding fibre of the fourth feeding cable 152. Input/output port 141 of the optical switch is optically connected to the proximal end of the first optical fibre of the first feeding cable 145 through fibre section 111, whereas input/output port 142 of the optical switch is optically connected to the proximal end of the second optical fibre of the fourth (last) feeding cable 152 through fibre section 114.

The first optical signal (pump) emitted from output port 141 is launched into the first feeding fibre of feeding cable 145, whereas the second optical signal (probe) is launched into the second optical fibre of feeding cable 152. The first optical signal enters one feeding fibre of a first feeding cable 145 of the first group, travels along the fibre loop, i.e., it propagates along all fibres of the feeding and heavy-duty cables of the first group, and emerges from a fibre of the last feeding cable 152. The second optical signal emitted from input/output port 142 is counter-propagating with respect to the first optical signal travelling along the fibre loop in the opposite direction. The Brillouin backscattered signal exiting the second optical fibre of feeding cable 152 enters the optical switch 140 and is analysed by the sampling apparatus 143.

Similarly, the distal ends of each of heavy-duty cables 155, 156 and 157 of the second group are optically connected one to another so as to form a second fibre loop with two open optical ends, namely the first optical fibre of feeding cable 158 and the second optical fibre of feeding cable 160. Within the fibre loop, the proximal end of the second optical fibre of the first feeding cable 158 is optically connected with the first optical fibre of the second feeding cable 159 and similarly the proximal end of the second optical fibre of the second feeding cable 159 is optically connected with the first optical fibre of the third feeding cable 160. Input/output ports 161 and 162 of the optical switch 140 are optically connected to respective first and second connection optical fibres of a connection optical cable 144, which has a first end proximal to the optical switch 140 and a second end distal with respect to the optical switch. At the distal end of optical cable 144, opposite to the proximal ends, first and second connection optical fibres are optically connected to the first optical fibre of feeding cable 158 and to the second optical fibre of feeding cable 160. In this way, the second group of heavy-duty cables receives the two sampling optical signals from connection cable 144, wherein the optical signals emitted from the apparatus 143 enter the optical switch 140 and are directed to the connection cable 144 by the optical switch 140. The Brillouin backscattered signal generated in the heavy-duty cables of the second group is fed back into the connection optical cable 144 and directed by the optical switch 140 to input/output ports 165 and 166, thus into the sampling apparatus 143.

The embodiment described with reference to the FIGS. 11 and 12 advantageously permits to further reduce costs of the monitoring system.

Although in the foregoing embodiments, the feeding cables are described to be provided with an optic fibre element including at least two optical fibres, because this may represent the case of a conventional power cable capable of transporting optical data and/or control signals, the present invention encompasses a feeding cabling system comprising a power feeding cable and an optical cable comprising at least two optical fibres. In that case, the optical cable can run alongside the power feeding cable and being optically connected to the strain and temperature optical fibres of the heavy-duty cables.

The present invention may find application in a monitoring system in which a sampling apparatus is optically connected directly to a plurality of heavy-duty cables provided with an optical fibre strain sensor and preferably with an optical fibre temperature sensor. In other words, in general, the fibre loop of the monitoring system does not need to comprise the feeding cables as intermediate power/control supply elements for the heavy-duty cables, especially if the plurality of electric cables to be monitored is not scattered across a vast area, such as a harbour container terminal.

The invention claimed is:
1. An electric cable comprising:
   a strain sensor longitudinally extending along the cable and comprising
      a single mode strain optical fibre arranged within a bending neutral region surrounding and comprising a bending neutral longitudinal axis of the electric cable;
   a strain-transferring filler; and at least three longitudinal structural elements, at least two of the at least three longitudinal structural elements being a core comprising an electrical conductor, wherein the strain sensor is embedded in the strain-transferring filler mechanically coupled and congruent with the at least three longitudinal structural elements at least in a strained condition.

2. The cable of claim 1, wherein the strain-transferring filler comprises an elastomer with Young's modulus of 0.01 to 0.7 GPa.

3. The cable of claim 1, wherein the strain-transferring filler is based on a thermosetting elastomer.

4. The cable of claim 1, wherein the strain sensor comprises a protective sheath surrounding the strain optical fibre and wherein the strain-transferring filler surrounds and is congruent with the protective sheath.

5. The cable of claim 4, wherein the protective sheath is based on a fibre reinforced composite.

6. The cable of claim 5, wherein the fibre reinforced composite of the protective sheath is reinforced with reinforcing fibres selected from glass, carbon, boron and graphite fibres.

7. The cable of claim 5, wherein reinforced fibres are oriented substantially along a longitudinal direction of the cable.

8. The cable of claim 4, wherein the protective sheath has a thickness of 500 to 1000 μm.

9. The cable of claim 5, wherein the fibre reinforced composite of the protective sheath is reinforced with reinforcing fibres, the reinforcing fibres being embedded in a cross-linked resin.

10. The cable of claim 4, wherein the strain sensor further comprises a tight buffer layer surrounding the strain optical fibre, the tight buffer layer being congruent with the strain optical fibre and the protective sheath.

11. The cable of claim 1, wherein the strain sensor further comprises a tight buffer layer surrounding the strain optical fibre.

12. The cable of claim 10, wherein the tight buffer layer comprises thermal resistant material.

13. The cable of claim 10, wherein the tight buffer layer comprises a radiation curable acrylate polymer.

14. The cable of claim 1, wherein the single mode strain optical fibre is coated with a coating system.

15. The cable of claim 1, wherein the electric cable has a substantial circular cross-section and the strain sensor is centrally located with respect to the at least three longitudinal structural elements.

16. The cable of claim 1, wherein the strain-transferring filler mechanically couples the strain sensor with at least two of the longitudinal structural elements in a substantially unstrained condition.

17. The cable of claim 15, wherein a neutral longitudinal axis is a central longitudinal axis of the electric cable and the at least three longitudinal structural elements are arranged radially external to the strain sensor.

18. The cable of claim 15, wherein the electric cable has a predefined minimum permissible radius of curvature, $\rho_{min}$, and the neutral region extends radially from a central longitudinal axis of not more than $0.02\rho_{min}$.

19. The cable of claim 1, further comprising a temperature optical fibre for temperature sensing extending along a cable length and enclosed in a longitudinally extending module in loose construction.

20. The cable of claim 19, wherein the longitudinally extending module is in an optical fibre element integrated in the cable in a position radially external to the strain sensor.

21. The cable of claim 1, wherein the strain sensor comprises:

a tight buffer layer surrounding the strain optical fibre; and a protective sheath enclosing the tight buffer layer, the strain-transferring filler surrounding and being congruent with the protective sheath, wherein at least one first element selected from the tight buffer layer, the protective sheath and the strain-transferring filler is made of a material elastic in a strain range where the cable has an elastic behaviour and at least one second element comprises a plastic material, and wherein the at least one second element made of plastic material is in contact with the at least one first element made of elastic material and has an axial rigidity smaller than the axial rigidity of the at least one first element made of elastic material.

22. The cable of claim 21, wherein the at least one second element made of a plastic material comprises the strain-transferring filler made of a material selected from a polyester with Young's modulus of 1 to 5 GPa, a polyamide with Young's modulus of 2 to 4 GPa, a polyvinyl chloride with Young's modulus of 0.003 to 0.01 GPa, a low-density polyethylene with Young's modulus of 0.1 to 0.3 GPa, and a high-density polyethylene with Young's modulus of 0.4 to 1.2 GPa.

23. The cable of claim 21, wherein the tight buffer layer is based on a radiation curable acrylate polymer.

24. The cable of claim 21, wherein the at east one first element made of elastic material comprises the protective sheath.

25. A deformation monitoring method for measuring at least tensile strain of at least one electric cable, comprising:

providing at least one electric cable comprising a strain sensor longitudinally extending along the cable and comprising a single mode strain optical fibre arranged within a bending neutral region surrounding and comprising a bending neutral longitudinal axis of the electric cable, a strain-transferring filler, and at least three longitudinal structural elements, at least two of the at least three longitudinal structural elements being a core comprising an electrical conductor, wherein the strain sensor is embedded in the strain-transferring filler mechanically coupled and congruent with the at least three longitudinal structural elements at least in a strained condition;

injecting a first optical signal into the strain optical fibre;

detecting Brillouin scattered light emitted from the strain optical fibre; and analysing the spectral changes in the scattered light so as to measure at least the tensile strain of the at least one electric cable.

26. The method of claim 25, wherein the at least one electric cable further comprises a temperature optical fibre for temperature sensing extending along a cable length and enclosed in a longitudinally extending module in loose construction, and wherein the temperature optical fibre is optically connected to the strain optical fibre, and further comprising injecting a second optical signal into the temperature optical fibre in a counter-propagating direction with respect to a first optical signal.

27. A deformation monitoring system for measuring at least tensile strain of at least one electric cable comprising:

an electric cable comprising a strain sensor longitudinally extending along the cable and comprising a single mode strain optical fibre having proximal and distal ends arranged within a bending neutral region surrounding and comprising a bending neutral longitudinal axis of the electric cable, a strain-transferring filler, and at least three longitudinal structural elements, at least two of the at least three longitudinal structural elements being a core comprising an electrical conductor, wherein the strain sensor is embedded in the strain-transferring filler mechanically coupled and congruent with the at least three longitudinal structural elements at least in a strained condition; and a sampling apparatus for measuring spectral changes of Brillouin scattered light in the strain optical fibre, the sampling apparatus being optically coupled with at least a proximal end of the strain optical fibre for injecting light into the strain optical fibre.

28. A deformation monitoring system for measuring at least tensile strain of a plurality of electric cables comprising:

a sampling apparatus for measuring spectral changes of Brillouin scattered light comprising a first and a second optical input/output port, the first input/output port being capable of emitting a first optical signal and the second input/output port being capable of emitting a second optical signal; and a first plurality of electric cables comprising a first and a last electric cable, each cable of the plurality comprising a strain sensor comprising a strain optical fibre and a temperature sensor comprising a temperature optical fibre, the strain and temperature sensors extending longitudinally along a respective cable, the strain optical fibre and temperature optical fibre having proximal ends and distal ends, the proximal ends being positioned at a proximal end of the respective electric cable, wherein:

the distal ends of the strain optical fibre and the temperature optical fibre of each electric cable are optically connected one to another, the proximal end of the strain optical fibre of the first electric cable of the first plurality is in optical communication with the first input/output of the sampling apparatus and the temperature optical fibre of the last electric cable of the first plurality is in optical communication with the second input/output port of the sampling apparatus, and the proximal end of the temperature optical fibre of the first electric cable is optically connected with the proximal end of the strain optical fibre of the last electric cable, so as to form an optical fibre loop in which the strain optical fibre and the temperature optical fibre of each electric cable of the plurality are in optical communication with both the first and the second input/output ports of the sampling apparatus and the first and second optical signals enter the optical fibre loop in opposite directions, wherein:

each electric cable of the first plurality of electric cables comprises at least three longitudinal structural elements, at least one of the at least three longitudinal structural elements being a core comprising an electrical conductor, the strain optical fibre of each heavy-duty cable being arranged within a bending neutral region surrounding and comprising a bending neutral longitudinal axis of the cable, a strain-transferring filler, and the strain sensor is mechanically coupled with at least one of the at least three longitudinal structural elements.

29. The system of claim 28, wherein each electric cable of the first plurality of electric cables is a heavy-duty cable.

30. The system of claim 29, wherein the strain sensor of each heavy-duty cable is embedded in the strain-transferring filler mechanically coupling at least one of the at least three longitudinal structural elements with the strain sensor in such a way that the strain experienced by the at least one of the at least three longitudinal structural elements is transferred to the strain sensor at least in a strained condition.

31. The system of claim 28, wherein the temperature sensor of each of the first plurality of electric cables extends along cable length and is enclosed in a longitudinally extending element in loose construction.

32. The system of claim 30, wherein the strain sensor of each heavy-duty cable comprises a protective sheath surrounding the strain optical fibre and wherein the strain-transferring filler surrounds and is congruent with the protective sheath.

33. The system of claim 28, further comprising a first plurality of feeding cables comprising a first and a last feeding cable, each feeding cable of the plurality being optically connected to a respective electric cable of the first plurality of electric cables, the first feeding cable being optically connected with the first electric cable and the last feeding cable being optically connected with the last electric cable wherein:

each feeding cable of the first plurality comprises a first feeding optical fibre and a second feeding optical fibre, the first and second feeding optical fibres each comprising a proximal end and a distal end, the distal ends of the first and second feeding optical fibres being respectively optically connected to the strain and temperature optical fibres of the respective electric cable, and the strain optical fibre of the first electric cable is in optical communication with the first input/output port of the sampling apparatus by connecting the proximal end of the first feeding optical fibre of the first feeding cable with the first input/output of the sampling apparatus and by connecting the proximal end of the second feeding optical fibre of the last feeding cable with the second input/output port of the measurement apparatus.

34. The system of claim 33, wherein each feeding cable of the first plurality is an electric cable, the first and second feeding optical fibres are integrated in the cable in loose construction, and each feeding cable is electrically connected to a respective heavy-duty cable on an end of the heavy-duty cable where an optical connection takes place.

35. The system of claim 28, wherein each electric cable of the first plurality of electric cables is mounted on respective mobile equipment.

36. The system of claim 35, wherein the mobile equipment is a crane comprising a supporting structure and a reel rotatably mounted on the supporting structure upon which a respective electric cable can be wound and unwound, the respective electric cable being engaged at a distal end thereof on the reel.

* * * * *